(12) United States Patent
Lawrence et al.

(10) Patent No.: US 10,549,498 B2
(45) Date of Patent: *Feb. 4, 2020

(54) COMPOSITES AND ARTICLES MADE FROM NONWOVEN STRUCTURES

(71) Applicant: National Nonwovens Inc., Easthampton, MA (US)

(72) Inventors: Mark Gregory Lawrence, Westfield, MA (US); Conrad Anthony D'Elia, Westfield, MA (US); Anthony Joseph Centofanti, Avon, CT (US); Paul Anthony Viveiros, Westfield, MA (US)

(73) Assignee: National Nonwovens Inc., Easthampton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/065,107

(22) Filed: Mar. 9, 2016

(65) Prior Publication Data

US 2016/0186367 A1     Jun. 30, 2016

Related U.S. Application Data

(63) Continuation of application No. 13/840,966, filed on Mar. 15, 2013, now Pat. No. 9,314,993.

(51) Int. Cl.
*B32B 5/02* (2006.01)
*D04H 13/00* (2006.01)
(Continued)

(52) U.S. Cl.
CPC ............. *B32B 5/022* (2013.01); *B32B 5/245* (2013.01); *B32B 7/12* (2013.01); *D04H 1/005* (2013.01);
(Continued)

(58) Field of Classification Search
CPC ......... D04H 1/54; D04H 1/5405; B32B 5/022
See application file for complete search history.

(56) References Cited

U.S. PATENT DOCUMENTS

| 3,908,645 A | 9/1975 | Sandvig |
| 4,195,112 A | 3/1980 | Sheard et al. |

(Continued)

FOREIGN PATENT DOCUMENTS

| EP | 0 151 722 A2 | 8/1985 |
| EP | 0 708 191 | 4/1996 |

(Continued)

OTHER PUBLICATIONS

14 CFR Pt 25, App. F, Federal Aviation Administration, 2012 (Year: 2012).*

(Continued)

*Primary Examiner* — Scott R. Walshon
*Assistant Examiner* — Jasper Saberi
(74) *Attorney, Agent, or Firm* — Wolf, Greenfield & Sacks, P.C.

(57) ABSTRACT

The present invention generally relates to composites and articles made from nonwoven structures. One aspect of the invention is generally directed to nonwoven structures which are heated and/or pressed to form a substantially rigid article. In some cases, the nonwoven structure may be heated to temperatures greater than the glass transition temperature but less than the melting temperature of a polymer within the nonwoven structure. Such articles may exhibit creep of the polymer around other fibers in the nonwoven structure, but without any evidence of melting and/or flow. In addition, in some embodiments, such articles may have relatively large void volumes, or exhibit properties such as low flammability, smoke resistance, or acoustic insulation. Other aspects of the present invention are gen- (Continued)

erally directed to systems and methods for making such articles, methods of use of such articles, kits comprising such articles, etc.

27 Claims, 1 Drawing Sheet

(51) Int. Cl.
| | |
|---|---|
| D04H 1/541 | (2012.01) |
| D04H 1/00 | (2006.01) |
| B32B 5/24 | (2006.01) |
| B32B 7/12 | (2006.01) |
| D04H 1/4342 | (2012.01) |
| D04H 1/551 | (2012.01) |
| D04H 1/587 | (2012.01) |
| D04H 1/54 | (2012.01) |
| D04H 1/4218 | (2012.01) |
| D04H 1/4242 | (2012.01) |
| D04H 1/4326 | (2012.01) |
| E04B 1/76 | (2006.01) |

(52) U.S. Cl.
CPC ......... *D04H 1/4218* (2013.01); *D04H 1/4242* (2013.01); *D04H 1/4326* (2013.01); *D04H 1/4342* (2013.01); *D04H 1/54* (2013.01); *D04H 1/541* (2013.01); *D04H 1/551* (2013.01); *D04H 1/587* (2013.01); *D04H 13/002* (2013.01); *B32B 2260/021* (2013.01); *B32B 2260/046* (2013.01); *B32B 2262/02* (2013.01); *B32B 2262/0284* (2013.01); *B32B 2262/101* (2013.01); *B32B 2262/106* (2013.01); *B32B 2266/0285* (2013.01); *B32B 2307/102* (2013.01); *B32B 2307/3065* (2013.01); *B32B 2307/548* (2013.01); *D04H 1/5405* (2013.01); *E04B 2001/7687* (2013.01); *Y10T 428/24628* (2015.01); *Y10T 442/2139* (2015.04); *Y10T 442/638* (2015.04)

(56) References Cited

U.S. PATENT DOCUMENTS

| | | | |
|---|---|---|---|
| 4,726,987 A | 2/1988 | Trask et al. | |
| 4,780,359 A | 10/1988 | Trask et al. | |
| 4,887,368 A | 12/1989 | Latzke | |
| 5,096,526 A | 3/1992 | Engwall | |
| 5,431,782 A | 7/1995 | Cassat | |
| 5,492,580 A | 2/1996 | Frank | |
| 5,721,177 A | 2/1998 | Frank | |
| 6,383,623 B1 | 5/2002 | Erb, Jr. | |
| 6,579,396 B2 | 6/2003 | Erb, Jr. | |
| 6,749,929 B1 | 6/2004 | Enkler et al. | |
| 7,132,025 B2 | 11/2006 | Dittmar | |
| 8,293,042 B2 | 10/2012 | Lorentz | |
| 9,314,993 B2* | 4/2016 | Lawrence | B32B 5/022 |
| 9,314,995 B2 | 4/2016 | Lawrence et al. | |
| 2003/0191203 A1 | 10/2003 | Oohara et al. | |
| 2004/0198125 A1* | 10/2004 | Mater | A47C 31/001 |
| | | | 442/394 |
| 2004/0248491 A1 | 12/2004 | Boscolo | |
| 2006/0068675 A1 | 3/2006 | Handermann et al. | |
| 2006/0105157 A1 | 5/2006 | Lorentz | |
| 2006/0189236 A1 | 8/2006 | Davis | |
| 2006/0219991 A1 | 10/2006 | Braterman et al. | |
| 2006/0240242 A1* | 10/2006 | Raghavendran | B32B 5/02 |
| | | | 428/304.4 |
| 2008/0038976 A1* | 2/2008 | Berrigan | D04H 3/00 |
| | | | 442/327 |
| 2010/0029156 A1 | 2/2010 | Tanaka et al. | |
| 2010/0261398 A1* | 10/2010 | Dry | B32B 5/26 |
| | | | 442/190 |
| 2011/0151737 A1* | 6/2011 | Moore | D04H 1/4291 |
| | | | 442/334 |
| 2011/0151738 A1 | 6/2011 | Moore et al. | |
| 2012/0276368 A1* | 11/2012 | Fernando | B32B 5/245 |
| | | | 428/319.1 |
| 2013/0045352 A1 | 2/2013 | Kern et al. | |
| 2014/0264985 A1 | 9/2014 | Sutti et al. | |
| 2014/0272318 A1 | 9/2014 | Lawrence et al. | |
| 2014/0273705 A1 | 9/2014 | Lawrence et al. | |
| 2016/0185076 A1 | 6/2016 | Lawrence et al. | |

FOREIGN PATENT DOCUMENTS

| | | |
|---|---|---|
| EP | 1 074 653 A2 | 2/2001 |
| JP | H09-307203 A | 11/1997 |
| JP | 2011-127252 A | 6/2011 |
| NL | 8 502 198 | 10/1986 |
| WO | WO 03/023108 A1 | 3/2003 |
| WO | WO 2006/076490 A2 | 7/2006 |

OTHER PUBLICATIONS

Standard Test Method for Specific Optical Density of Smoke Generated by Solid Materials, ASTM International, 1996 (Year: 1996).*
ULTEM 1000, Poly-Tech Industrial, Inc., 2011 (Year: 2011).*
"Microscopic Definition", Merriam-Webster Dictionary, Apr. 22, 2009, https://www.merriam-webster.com/dictionary/microscopic (Year: 2009).*
International Search Report and Written Opinion dated Sep. 30, 2014 for Application No. PCT/US2014/022982.
Invitation to Pay Additional Fees dated Aug. 5, 2014 for Application No. PCT/US2014/022999.
International Search Report and Written Opinion dated Dec. 22, 2014 for Application No. PCT/US2014/022999.
International Preliminary Report on Patentability dated Sep. 24, 2015 for Application No. PCT/US2014/022982.
International Preliminary Report on Patentability dated Sep. 24, 2015 for Application No. PCT/US2014/022999.
[No Author Listed], Flammability Requirements for Aircraft Seat Cushions. Federal Aviation Administration. Advisory Circular. Sep 17, 1986. http://www.faa.gov/documentLibrary/media/Advisory_Circular/AC%2025.853-1.pdf [last accessed Sep. 22, 2014]. 11 pages.
[No Author Listed], Standard Test Method for Specific Optical Density of Smoke Generated by Solid Materials. ASTM International. Jul. 10, 2014. http://enterprise.astm.org/SUBSCRIPTION/NewValidateSubscription.cgi?E662-03-HTML [last accessed Jul. 10, 2014]. 39 pages.
[No Author Listed], Polyaramid Fibre. Goodfellow. May 18, 2012. http://www.goodfellow.com/E/Polyaramid-Fibre.html [last accessed Jul. 10, 2014]. 3 pages.
[No Author Listed], Technical Guide: Kevlar Aramid Fiber. DuPont. Aug. 8, 2007:I.1-IV.4. http://www2.dupont.com/Kevlar/en_US/assets/downloads/KEVLAR_Technical_Guid.pdf [last accessed Jul. 10, 2014]. 32 pages.
[No Author Listed], 14 CFR Pt 25, Federal Aviation Administration. 2012. 51 pages.
[No Author Listed], ULTEM 1000. Poly-Tech Industrial, Inc. 2011. 3 pages.
Reinhardt, Development of a New Flammability Test for Aircraft Ducting and Wiring. Federal Aviation Administration. Presentation to the International Aircraft Materials Fire Testing Working Group. Mar. 3-4, 2010. http://www..fire.tc.faa.gov/2010Conference/files/Material_Test_Method_Development/ReinhardtDucting/ReinhardtDuctingWiringUpdate.pdf [last accessed Sep. 22, 2014]. 35 pages.
[No Author Listed], SABIC's High-Performance ULTEM™ Fiber Helps National Nonwovens Create First Fire Blocker Suitable for All Aircraft Seating Dress Covers. Oct. 2, 2012. http://www.sabic-

(56) References Cited

OTHER PUBLICATIONS ip.com/gep/en/NewsRoom/PressReleaseDetail/october_02_2012_sabicshighperformance.htm [last accessed Sep. 22, 2014]. 2 pages.
[No Author Listed], Innovative Aerospace Solutions: Ultra-ProTechtor™. TechNews Newsletter for National Nonwowen Technical Textiles. 2012 Spring;1. http://www.nationalnonwovens.com/pdf/TechNews-Spring2012-pg1.pdf [last accessed Sep. 22, 2014]. 1 page.
[No Author Listed], National Nonwovens Introduce Ultra-ProTechtor™ Fire-Blocker. National Nonwovens. Press Release. Mar. 7, 2012. http://www.nationalnonwovens.com/pdf/Press%20Release%20-%20Ultra-ProTechtor.pdf [last accessed Sep. 22, 2014]. 2 pages
Office Communication dated Jul. 18, 2014 for U.S. Appl. No. 13/840,966.
Office Communication dated Aug. 1, 2014 for U.S. Appl. No. 13/840,794.
Office Communication dated Mar. 13, 2015 for U.S. Appl. No. 13/840,966.
Office Communication dated Mar. 31, 2015 for U.S. Appl. No. 13/840,794.
Office Communication dated Nov. 8, 2017 for U.S. Appl. No. 15/064,913.
Office Communication dated May 4, 2018 for U.S. Appl. No. 15/064,913.
U.S. Appl. No. 15/064,913, filed Mar. 9, 2016, Lawrence et al.
PCT/US2014/022982, Sep. 30, 2014, International Search Report and Written Opinion.
PCT/US2014/022982, Sep. 24, 2015, International Preliminary Report on Patentability.
PCT/US2014/022999, Aug. 5, 2014, Invitation to Pay Additional Fees.
PCT/US2014/022999, Dec. 22, 2014, International Search Report and Written Opinion.
PCT/US2014/022999, Sep. 24, 2015, International Preliminary Report on Patentability.

* cited by examiner

COMPOSITES AND ARTICLES MADE FROM NONWOVEN STRUCTURES

RELATED APPLICATIONS

This application is a continuation of U.S. patent application Ser. No. 13/840,966, filed Mar. 15, 2013, entitled "Composites and Articles Made from Nonwoven Structures," by Lawrence, et al., incorporated herein by reference in its entirety.

FIELD

The present invention generally relates to composites and articles made from nonwoven structures.

BACKGROUND

Nonwoven structures are typically made from fibers that are assembled together without weaving or knitting the individual fibers together. In some cases, the nonwoven structure may resemble a fabric material, and is often flexible or drapable. The nonwoven structures may be formed by entangling the individual fibers together mechanically, thermally, chemically, etc. For example, the nonwoven structure may be fabricated using needlepunching or needlefelting technologies, where needles are used to mechanically entangle individual fibers together to form the nonwoven structure. Other technologies for forming nonwoven structures include thermal bonding, hydroentaglement, ultrasonic bonding, or chemical bonding. Such nonwoven structures may be used in a wide range of applications, for instance, for apparel, home furnishings, health care, engineering, industrial, or consumer goods.

SUMMARY

The present invention generally relates to composites and articles made from nonwoven structures. One aspect of the invention is generally directed to nonwoven structures which are heated and/or pressed to form a substantially rigid article. In some cases, the nonwoven structure may be heated to temperatures greater than the glass transition temperature but less than the melting temperature of a polymer within the nonwoven structure. Such articles may exhibit creep of the polymer around other fibers in the nonwoven structure, but without any evidence of melting and/or flow. In addition, in some embodiments, such articles may have relatively large void volumes, or exhibit properties such as low flammability, smoke resistance, or acoustic insulation. Other aspects of the present invention are generally directed to systems and methods for making such articles, methods of use of such articles, kits comprising such articles, etc. The subject matter of the present invention involves, in some cases, interrelated products, alternative solutions to a particular problem, and/or a plurality of different uses of one or more systems.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

One aspect of the present invention is generally directed to articles comprising a first polymer (which may be in the form of first fibers) and second fibers (which may comprise a second polymer), where the articles are characterized by having nonwoven structures that have been heated and/or pressed to form the articles. The first polymer and the second polymer may be different from each other, and/or the polymers may be the same but the physical characteristics of the first fibers and the second fibers may be different from each other. However, it should be understood that the second fibers are not necessarily limited to only polymeric fibers, and the first polymer may not necessarily be fibrous, particularly after being subjected to any heating/pressing procedures. As discussed in more detail below, such articles may be relatively stiff yet surprisingly light, e.g., due to the relatively large void volume contained within the articles and/or the materials forming the article. In contrast, typical heated and compressed prior art articles made from nonwoven materials often do not contain large void volumes, and are accordingly much denser and/or substantially nonporous.

The articles can be prepared, in certain embodiments, by heating and/or pressing a nonwoven structure comprising first fibers (e.g., comprising the first polymer) and second fibers such that at least some of the first fibers reach a temperature greater than the glass transition temperature but less than the melting temperature of the first polymer. In some cases, the first polymer can also be present in other suitable forms within the nonwoven structure, e.g., instead of or in addition to fibers. Regardless, by heating and/or pressing the nonwoven structure, the first polymer may creep around the second polymer fibers in the nonwoven structure, which may result in a stiffer material, without, in certain cases, substantial flow into/filling void spaces defined by the second polymer fibers. In addition, the degree of crystallinity of the first polymer may increase under such conditions, which may also cause the material to become stiffer. In some cases, the density or specific gravity of the first polymer may increase; this may cause the polymer to become denser, which may also cause the resulting material to become stiffer. However, because in certain embodiments the first polymer is not liquefied during this process, the first polymer does not fill in all/much of the void spaces within the material, and thus, the article after formation may retain a surprisingly high void volume.

Figure 1:
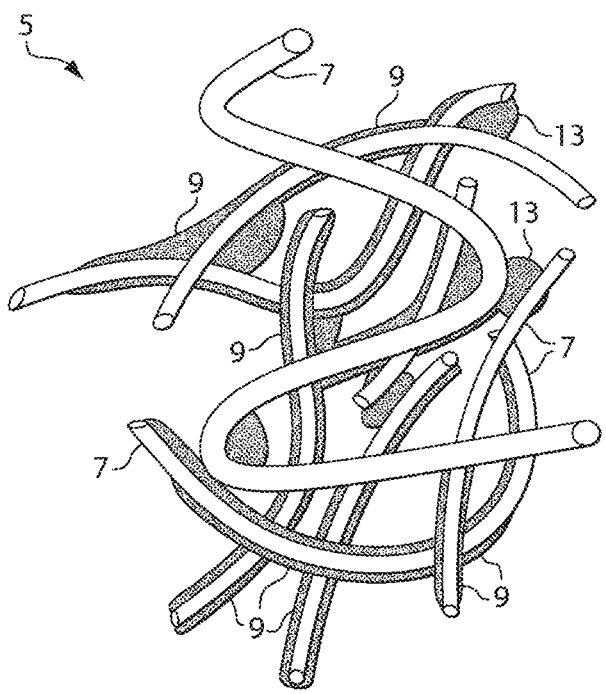
FIG. 1 is a schematic diagram illustrating a portion of an article according to one embodiment of the invention.
Figure 2:
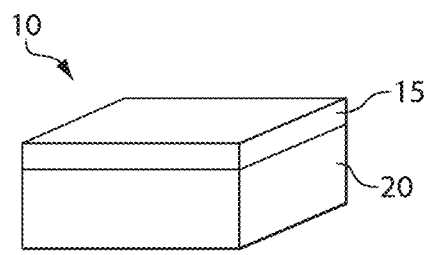
FIG. 2 illustrates a composite in accordance with another embodiment of the invention.
Figure 3:
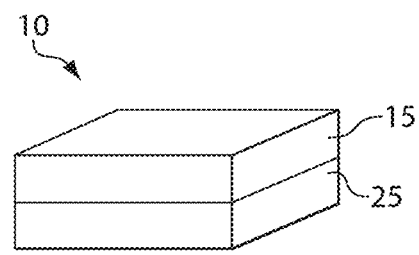
FIG. 3 illustrates a composite in accordance with yet another embodiment of the invention.
Figure 4:
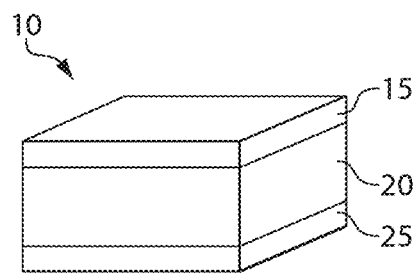
FIG. 4 illustrates a composite in accordance with still another embodiment of the invention.
Figure 5:
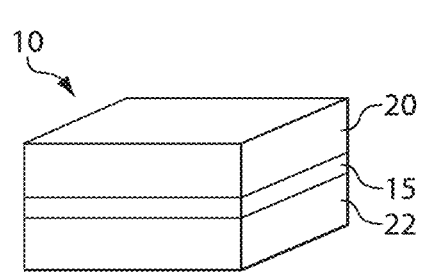
FIG. 5 illustrates a composite in accordance with another embodiment of the invention.

An illustrative non-limiting example of such an article is shown schematically in FIG. 1. In this figure, article 5 comprises a plurality of fibers 7 that are partially or fully coated with a polymer 9. In some cases, crystals or spherulites 13 of polymer 9 may also be present within the article, e.g., deposited or formed during formation, and some of these may also be attached to or immobilized on some of the fibers 7 in certain embodiments. Without wishing to be bound by any theory, it is believed that polymer 9, present as a coating and/or as crystals or spherulites, may be attached to and may thereby help to reduce or prevent fibers 7 from moving with respect to each other, thereby causing the article to exhibit increased rigidity or structural stability.

In contrast, in typical prior art techniques, higher temperatures are used, typically temperatures that are greater than the melting temperature of at least the first polymer. By using temperatures that are high enough to cause the first polymer to liquefy, the first polymer is made to flow and surround the second fibers in the nonwoven structure. However, because the first polymer is liquid, the first polymer also flows more readily, and thus will fill in voids within the material, which results in a solid, relatively dense material having little or no void volume. Temperatures higher than the melting temperature of the first polymer are commonly used in the prior art since the first polymer, once liquefied, is easily processed; accordingly, temperatures below the melting temperature are typically not used. In addition, it is believed that typical prior art processes have not recognized the importance of creep without flow and have thus focused on use of polymeric fibers that have properties that do not readily facilitate creep and/or processing conditions that are not conducive to creep.

Accordingly, one aspect of the invention is generally directed to articles having a relatively high void volume, while being relatively stiff or rigid. In some cases, such articles may be prepared as summarized above (and as discussed in more detail below). The article may be sufficiently rigid that it cannot be permanently deformed by an unassisted human being of average strength, and in some cases, the article may be sufficient rigid that it cannot be substantially bent by an unassisted human being of average strength, e.g., as determined visually. In addition, in some cases, the article may be self-supporting, and/or the article may have a degree of rigidity or structural stability that allows it to bear a load. The article also may be unitary in some embodiments, e.g., the article is a solid piece of material and not a loose collection or batt of unconsolidated fibers. For example, the unitary article may comprise fibers comprising a poly(paraphenylene terephthalamide) and a polyetherimide disposed on at least some of the fibers, where the article has a void volume of at least about 50%. Methods and systems for producing such articles, e.g., from nonwoven structures, are discussed in more detail below.

One feature of such articles, at least in certain embodiments, is a relatively high void volume. Generally speaking, the void volume is a determination of the amount of empty space or voids (typically filled with air) within an article. For example, the article can define pores, cells, channels, and/or other structures internally within the article that define voids. In some cases, for instance, the void volume is defined by a plurality of fibers forming the article, which may be at least partially surrounded by a polymer, e.g., forming a web or matrix of fibers. In some cases, as discussed herein, due to the presence of the polymer, the fibers are relatively immobile with respect to each other, thereby causing the article to exhibit rigidity or structural stability.

The void volume of an article may be determined using any suitable technique. For example, the void volume of an article can be determined using a microscope to estimate the amount of void space within the article, or the void volume of the article may be determined by calculating the volume of polymer within the article by multiplying the density of the polymer times the mass of polymer present within the article, and comparing the expected volume of polymer to the total actual volume of the article. The void volume may be, for example, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, or at least about 85%. In addition, in some cases, the void volume can also be no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, or no more than about 30%. Combinations of these are also possible in some embodiments; for example, the article may have a void volume of between about 50% and about 90%. Thus, as a non-limiting example, an article may have a void volume of at least about 50%, and comprise fibers comprising a poly(paraphenylene terephthalamide) and a polyetherimide disposed on at least some of the fibers, or any other materials or polymers described herein. In some cases, the article may also have a density of at least about 0.1 g/cm$^3$, as discussed herein.

The voids may be substantially uniformly distributed within the article, although in some cases, the voids are not uniformly distributed. The voids can be closed voids, open and interconnected to each other, or any combination of these. If the article comprises a plurality of closed voids, the voids may have substantially the same or substantially different volumes, shapes, or dimensions. In some cases, the voids may have a number average pore size (with pore size being the smallest cross-sectional dimension of the pore) determined by microscopy or a mean flow pore size determined by porometry of at least about 5 micrometers, at least about 10 micrometers, at least about 15 micrometers, at least about 20 micrometers, at least about 25 micrometers, at least about 50 micrometers, 75 micrometers, at least about 100 micrometers, at least about 150 micrometers, at least about 200 micrometers, at least about 250 micrometers, at least about 500 micrometers, at least about 750 micrometers, at least about 1,000 micrometers, etc. In addition, in certain embodiments, the average pore size may be no more than about 2,000 micrometers, no more than about 1,000 micrometers, no more than about 750 micrometers, no more than about 500 micrometers, no more than about 250 micrometers, no more than about 200 micrometers, no more than about 150 micrometers, no more than about 100 micrometers, no more than about 75 micrometers, no more than about 50 micrometers, no more than about 25 micrometers, no more than about 20 micrometers, no more than about 15 micrometers, or no more than about 10 micrometers. In some cases, the average pore size is a combination of any of these, e.g., the average pore size may be between about 200 micrometers and about 2,000 micrometers in one embodiment. Techniques known to those of ordinary skill in the art, such as microscopy or electron microscopy, capillary flow porometry, etc. may be used to determine the average pore size within the article.

The article may also have a relatively high density, as compared to nonwoven structure initially formed from the individual fibers prior to heating and/or compression to form the article, although the density of the article may be lowered due to the presence of voids within the article. For example, in one set of embodiments, the article has a density of at least about 0.01 g/cm$^3$, at least about 0.02 g/cm$^3$, at least about 0.03 g/cm$^3$, at least about 0.05 g/cm$^3$, at least about 0.1 g/cm$^3$, at least about 0.2 g/cm$^3$, at least about 0.3 g/cm$^3$, at least about 0.5 g/cm$^3$, at least about 0.7 g/cm$^3$, at least about 1 g/cm$^3$, etc. The density can also be no more than about 1.5 g/cm$^3$, no more than about 1 g/cm$^3$, no more than about 0.7 g/cm$^3$, no more than about 0.5 g/cm$^3$, no more than about 0.3 g/cm$^3$, no more than about 0.2 g/cm$^3$, no more than about 0.1 g/cm$^3$, no more than about 0.05 g/cm$^3$, no more than about 0.03 g/cm$^3$, or no more than about 0.2 g/cm$^3$. In some cases, the density of the article falls between any two of the above stated ranges, e.g., the density may be between 0.5 g/cm$^3$ and about 0.7 g/cm$^3$.

In certain aspects, the articles are formed from a first polymer and second fibers. The first polymer and second fibers are formed into nonwoven structures that are heated to a temperature that is greater than or equal to the glass transition temperature of the first polymer and less than or equal to the melting temperature of the first polymer. The first polymer may be initially present as fibers within the nonwoven structures, although the first polymer may also be present in other forms. The second fibers can be formed from any of a variety of materials, including a polymer, as is discussed below. In some cases, the second polymer will have a glass transition temperature or a melting temperature higher than the melting temperature of the first polymer.

As mentioned, the first polymer may be any suitable polymer, and in certain embodiments is a polymer that has both a glass transition temperature and a melting temperature. In some cases, the first polymer may have a fairly large interval between these temperatures. For example, the first polymer may have an interval between the glass transition temperature and the melting temperature of at least about 10° C., at least about 25° C., at least about 50° C., at least about 75° C., at least about 100° C., at least about 125° C., at least about 150° C., at least about 175° C., at least about 200° C., at least about 250° C., at least about 300° C., at least about 350° C., at least about 400° C., at least about 450° C., at least about 500° C., etc., or no more than about 600° C., no more than about 500° C., no more than about 450° C., no more than about 400° C., no more than about 350° C., no more than about 300° C., no more than about 250° C., no more than about 200° C., no more than about 175° C., no more than about 150° C., no more than about 100° C., no more than about 75° C., no more than about 50° C., no more than about 25° C., etc., and/or any combination of these.

Generally speaking, the glass temperature of a polymer is the temperature at which the polymer exhibits a phase transition from a hard and relatively brittle state into a more ductile or rubber-like state. Those of ordinary skill in the art will be familiar with glass transition temperatures, and will be able to readily identify the glass transition temperature of a polymer, for instance, by experimental techniques such as differential scanning calorimetry (DSC). In addition, it should be noted that while this is commonly referred to as the glass transition temperature, in some cases, the glass transition temperature is measured as a range of temperatures where the phase transition occurs, and the reported glass transition temperatures in the scientific literature in such cases are usually at or near the midpoint of this phase transition.

In contrast, the melting temperature is the temperature where the polymer undergoes a phase change to a liquid. In some cases, e.g., for certain types of polymers, the melting temperature is also referred to the softening temperature; this is especially true for polymers that gradually melt over a range of temperatures rather than at a specific, sharply-defined melting temperature. However, softening temperatures or melting temperatures for most polymers are typically higher than the glass transition temperatures of those polymers.

Without wishing to be bound by any theory, it is believed that when a suitable first polymer is heated to a temperature that is greater than or equal to its glass transition temperature and less than or equal to its melting temperature, the first polymer may be deformed, e.g., under pressure without substantial flow. The deformation, in some cases, may be such that the first polymer can contact or even coat fibers (e.g., second fibers) within a nonwoven structure. In some cases, pressure (which may be internally and/or externally generated, as discussed herein) is also applied to facilitate creep or deformation of the first polymer, e.g., before, during, or after heating, depending on the application. However, because such techniques do not require heating to temperatures greater than the melting point of the first polymer, in some cases, close examination of the article may show that while the first polymer is disposed on at least some of the fibers, the structure of the first polymer does not show evidence of melting and/or substantial flow. In addition, as previously discussed, such articles may also show a relatively high void volume in some instances.

In addition, in some embodiments, the first polymer may also show a higher degree of crystallinity, e.g., due to heating above the glass transition temperature. Increasing the crystalliinty of the first polymer may increase the strength or modulus of the first polymer, and/or reduce the resistance of the first polymer to thermal energy. In addition, in some embodiments, after heating and/or pressing a non-woven material comprising the first polymer as discussed herein, the degree of crystallinity within the polymer may increase by at least about 5%, at least about 10%, at least about 15%, at least about 20%, at least about 25%, etc. In some cases, the crystallinity may increase by no more than about 30%, no more than about 25%, no more than about 20%, no more than about 15%, no more than about 10%, etc., or combinations of these (e.g., between about 10% and about 20%).

Most polymers may exhibit both glass transition temperatures and melting temperatures, and hence could potentially be well suited for use as the first polymer. Examples of materials potentially useful as the first polymer are discussed in more detail below. However, it has been found that certain types of polymers may work particular well under certain conditions, e.g., due to properties they exhibit at such temperatures, which facilitate creep. Other polymers may have less of a tendency to exhibit creep, and thus have been typically heated in the prior art to higher temperatures, e.g., above their melting points. In one set of embodiments, the first polymer may be a polymer that is amorphous, or at least partially amorphous. For example, the first polymer may be present as polymer fibers (or as other forms as discussed below) that are completely amorphous, or at least have regions that are amorphous. Non-limiting examples of polymers that are amorphous, at least in some cases, include polystyrene, polymethylmethacrylate, polyphenelene sulfides, polysulfone, polyetherimide (e.g., Ultem® from SABIC), polyetheretherketone, polyethersulfone, polyisobutylene, poly(vinyl acetate), novoloid (e.g., Kynol® from American Kynol, and the like. In addition, it should be noted that certain polymers other than these can be made to be amorphous or semicrystalline, depending on the synthesis technique, and can also be used in some embodiments of the invention.

Polymers are typically composed of long molecular chains which are irregular and often entangled, depending on their length. While most polymers are generally disordered, such polymers typically will exhibit some degree of alignment of the polymer chains, and those regions are said to be aligned, creating regions called semicrystalline regions. The semicrystalline regions are typically roughly 1 micrometer in size, although the degree of crystallinity and the size of the semicrystalline regions may vary based on factors such as the size and orientation of the molecular chains, the synthesis technique, and the monomers forming the polymer. The degree of crystallinity in a polymer can be determined using techniques such as X-ray diffraction (XRD) or other X-ray scattering techniques known to those of ordinary skill in the art. In some cases, the degree of crystallinity of an amorphous polymer may be less than about 25%, less than about 20%, less than about 15%, less than about 10%, or less than about 5%. In addition, an amorphous polymer may be determined in some embodiments by determining its melting temperature; in some cases, an amorphous polymer will not exhibit a sharp melting point (e.g., due to a lack of crystalline regions or domains), and in some cases, the amorphous polymer may not even exhibit a definable or determinable melting point.

With respect to the second fiber, any suitable material can be used as the second fiber (and in some instances, also as the first fiber). Suitable materials for use as the second fiber will in certain embodiments have melting temperatures (or decomposition temperatures for non-melting materials) higher than the glass transition temperature of the first polymer. Examples of materials that can be used as the second fiber (or also the first fiber in certain embodiments) include, but are not limited to, cotton or other plant fibers, wood fibers, animal fibers, glass fibers, fiberglass, carbon fibers, mineral fibers, metallic fibers, or synthetic or polymeric fibers. Non-limiting examples of polymers that may be used in the polymeric fibers include polyamides such as nylons, novoloid (e.g., Kynol® from American Kynol, novolacs, phenolic fibers, melamines, polyesters, polypropylenes, polyethylenes, polystyrenes, polyacrylic acids, polyacrylonitriles, polyimides, polyetherimides, polyamideimides, polymethyl methacrylates, polyphenelene sulfides, aramids (e.g., meta- or para-aramids, e.g., Kevlar® from Dupont), polybenzimidazoles, polyphenylenebenzobizoxazoles, aromatic polyketones (e.g., polyetheretherketones, polyetherketoneketones, etc.), polyvinyl acetates, polysulfones, polyethersulfones, polyurethanes, polyisobutylenes, liquid crystal polymers, poly(paraphenylene terephthalamide), etc. A polymeric fiber may comprise one or more than one of these polymers, and/or other polymers, or a polymeric fiber can be formed from or consist essentially of one type of polymer. In addition, in some embodiments, more than one type of second fiber (and/or optionally more than one type of first polymer/fiber) may be present within the article. For instance, the article can include one, two, three, or more fiber types having different compositions, lengths, diameters, densities, etc. Other materials can also be present within the article, in some embodiments.

The fibers within the article may be of any suitable length, size, composition, diameter, mass density, etc. Non-limiting examples of such fibers are discussed in detail herein. However, it should also be understood that the fibers within the final article can also have dimensions, physical properties, and/or compositions that differ somewhat from the initial fibers, e.g., due to the effects of heating and/or pressure on the fibers.

As mentioned, in some embodiments of the invention, the second fiber comprises a second polymer, which may be different from the first polymer. Accordingly, if more than one type of polymer is present within the article, the polymers may be present in any suitable ratio or percentage. For example, in some embodiments, a polymer comprises at least about 5% (by mass) of all of the material within the article. In certain instances, the first polymer can comprise at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of the of all of the material within the article. In some cases, the first polymer can comprise no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, no more than about 15%, no more than about 10%, or no more than about 5% of all of the material within the article. Suitable combinations of any of these are also contemplated in various embodiments of the invention, e.g., the first polymer may comprise at least about 10% and no more than about 90% of all of the material within the article.

Polymer mixtures can also be measured by mass ratios within the article. For example, if two types of polymers are present within the article, the mass ratio of the first polymer to the second polymer within the article can be between about 50:1 and about 1:50, between about 40:1 and about 1:40, between about 30:1 and about 1:30, between about 20:1 and about 1:20, between about 10:1 and about 1:10, between about 5:1 and about 1:5. As additional non-limiting examples, the mass ratio of the first polymer to the second polymer within the article may be between about 50:1 and about 1:1, between about 40:1 and about 1:1, between about 30:1 and about 1:1, between about 20:1 and about 1:1, between about 10:1 and about 1:1, between about 5:1 and about 1:1, between about 2:1 and about 1:1, etc.

In one set of embodiments, the fibers within the article may have any suitable diameter (or smallest cross-sectional dimension for fibers that are not in the form of circular cylinders, e.g., for 4DG-shaped fibers). As non-limiting examples, the article may comprise fibers having an average diameter of less than about 500 micrometers, less than about 400 micrometers, less than about 300 micrometers, less than about 200 micrometers, less than about 100 micrometers, less than about 90 micrometers, less than about 80 micrometers, less than about 70 micrometers, less than about 60 micrometers, less than about 50 micrometers, less than about 40 micrometers, less than about 30 micrometers, less than about 25 micrometers, less than about 20 micrometers, less than about 15 micrometers, less than about 10 micrometers, less than about 5 micrometers, less than about 1 micrometer, less than about 0.5 micrometers, less than about 0.3 micrometers, less than about 0.1 micrometers, less than about 0.05 micrometers, etc. In some embodiments, the fibers may have an average diameter of at least about 0.05 micrometers, at least about 0.1 micrometers, at least about 0.3 micrometers, at least about 0.5 micrometers, at least about 1 micrometer, at least about 5 micrometers, at least about 10 micrometers, at least about 15 micrometers, at least about 20 micrometers, at least about 25 micrometers, at least about 30 micrometers, at least about 40 micrometers, at least about 50 micrometers, at least about 60 micrometers, at least about 70 micrometers, at least about 80 micrometers, at least about 90 micrometers, at least about 100 micrometers, at least about 200 micrometers, at least about 300 micrometers, at least about 400 micrometers, etc. Suitable combinations of any of these are also contemplated in some embodiments of the invention, e.g., the fibers may have a diameter of between about 50 micrometers and 100 micrometers. If more than one type of fiber is present in the article, the fibers independently can have the same or different diameters. In addition, the diameters may be substantially the same, or there may be a range of diameters for fibers with substantially the same composition within the article. Also, fibers having different diameters within an article can independently have the same or different compositions.

The fibers within the article can also have any suitable length, and the lengths of the fibers may be substantially the same, or there may be a range of lengths present within the article for fibers with substantially the same composition. For example, the fibers may have a length of about 15 inches or less, about 12 inches or less, about 11 inches or less, about 10 inches or less, about 9 inches or less, about 8 inches or less, about 7 inches or less, about 6 inches or less, about 5 inches or less, about 4 inches or less, about 3 inches or less, about 2 inches or less, or about 1 inch or less, depending on the embodiment. (1 inch is 25.4 mm.) In some embodiments, the fibers may also have a length of at least about 1 inch, at least about 2 inches, at least about 3 inches, at least about 4 inches, at least about 5 inches, at least about 6 inches, at least about 7 inches, at least about 8 inches, at least about 9 inches, at least about 10 inches, at least about 11 inches, at least about 12 inches, etc., and/or combinations of any of these (e.g., the fibers within the article may have a length of between about 3 inches and about 8 inches). If more than one fiber type is present in the article, the fiber types can independently have the same or different lengths. Fibers having different lengths within an article can also independently have the same or different compositions. In addition, the lengths may be substantially the same, or a range of lengths may be present for fiber types with substantially the same composition within the article.

In addition, in certain embodiments, a resin may be present within the article that increases its rigidity, or otherwise enhances its structural properties. Non-limiting examples of suitable resins include phenolic resins, acetal resin, acrylic resins, polyetheretherketone resins, polyester resins such as unsaturated polyester resins, polyphenelene sulfide resins, polyetherimide resin, melamine resins, epoxy resins, silica resins, urethane resins, solvent impregnated resins, or the like. The resins may be added, for example, before the nonwoven structure is pressed and/or heated to form the article. In some cases, the resin may be heated and caused to flow to come into contact with fibers within the article, which may strengthen the article.

The article may also have any suitable shape or size. In some cases, the article may be substantially planar, although this is not necessarily a requirement for all embodiments. In other applications, the article may be shaped or molded to have different configurations, such as a specific shape (e.g., an irregular shape, plane curve, manifold, etc.) that is useful for a certain application. As examples, the article may be a shaped or molded as a component within a car, truck, train, boat, aircraft, or other vehicle, as a floor covering (or part of a floor covering), as construction material (or as a part thereof), or the like. As a specific non-limiting example, the article may form part of the wall of an interior of a car, truck, train, boat, aircraft, or other vehicle, and accordingly the article may have a suitable shape for such an application.

The article can have any suitable thickness or smallest dimension, e.g., if the article is substantially planar. For example, the thickness of the article, or the smallest dimension of the nonwoven structure, may be at least about 0.01 inches, at least about 0.02 inches, at least about 0.03 inches, at least about 0.05 inches, at least about 0.1 inches, at least about 0.25 inches, at least about 0.5 inches, at least about 0.75 inches, at least about 1 inch, at least about 1.25 inches, at least about 1.5 inches, at least about 1.75 inches, at least about 2 inches, at least about 2.25 inches, at least about 2.5 inches, at least about 2.75 inches, at least about 3 inches, at least about 3.5 inches, at least about 4 inches, at least about 4.5 inches, at least about 5 inches, at least about 6 inches, at least about 7 inches, at least about 8 inches, at least about 9 inches, at least about 10 inches, at least about 12 inches, etc. In addition, in some cases, the article may be no more than about 13 inches, no more than about 12 inches, no more than about 10 inches, no more than about 9 inches, no more than about 8 inches, no more than about 7 inches, no more than about 6 inches, no more than about 5 inches, no more than about 4.5 inches, no more than about 4 inches, no more than about 3.5 inches, no more than about 3 inches, no more than about 2.75 inches, no more than about 2.5 inches, no more than about 2.25 inches, no more than about 2 inches, no more than about 1.75 inches, no more than about 1.5 inches, no more than about 1.25 inches, no more than about 1 inch, no more than about 0.75 inches, no more than about 0.5 inches, no more than about 0.25 inches, no more than about 0.1 inches, no more than about 0.05 inches, no more than about 0.03 inches, no more than about 0.02 inches, etc. In some embodiments, the article falls within any suitable combination of these ranges, e.g., between 0.5 inches and 2 inches in thickness or smallest dimension.

In one set of embodiments, other materials or layers may be attached or immobilized to the article to form a composite. The composite may thus comprise other materials or layers such as foams, woven structures, other nonwoven structures, backing or protective layers or materials, layers or materials that provide structural support or flexibility to the composite, layers or materials to provide flame resistance and/or thermal and/or acoustic insulation, or the like. Non-limiting examples of such materials that may be present within the composite, such as foams or other nonwoven structures, include any of those disclosed in a U.S. patent application entitled "Composites Comprising Nonwoven Structures and Foam," filed on Mar. 15, 2013, incorporated herein by reference in its entirety.

As illustrative non-limiting examples, the composite may include other layers such as foams, nonwoven structures, woven structures, etc. Examples of such structures are shown in FIGS. 2-5. For instance, in FIG. 2, composite 10 comprises article 15 and foam 20; in FIG. 3, composite 10 comprises article 15 and nonwoven structure 25; in FIG. 4, composite 10 comprises both foam 20 and a nonwoven structure 25; and in FIG. 5, composite 10 comprises two foams 20, 22 (which may be the same or different) surrounding article 15. As another non-limiting example, composite 10 in FIG. 5 in another embodiment may comprise article 15, a foam 20, and a woven material 22. For purposes of clarity, the article depicted in each of these figures is being substantially planar, although the article need not be substantially planar in other embodiments, as previously discussed.

One set of embodiments is generally directed to articles (and/or composites comprising articles) that may be relatively stiff or rigid, and in some cases, also having a relatively large void volume. Without wishing to be bound by any theory, it is believed that during the formation process, the first polymer within the article may exhibit creep to contact or surround other fibers in the nonwoven structure, as the first polymer is heated to temperatures greater than the glass transition temperature but less than the melting temperature of any polymer fibers within the nonwoven structure. Typically, the other fibers are formed from materials that are not adversely affected during this process. For instance, the other fibers may be formed of materials having a melting temperature, glass transition temperature, thermal decomposition temperature (i.e., the temperature at which the material begins to chemical decompose, e.g., via oxidation reactions or the like), etc. that is higher than the temperature(s) to which the article is heated. A variety of different processes may occur during creep movement of a polymer, and techniques for determining and modeling creep are known to those of ordinary skill in the art. At temperatures above its glass transition temperature, the polymer is still relatively solid, but the polymer can be deformed more easily than at temperatures below the glass transition temperature, where the polymer is more rigid. Thus, under suitable temperatures and/or pressures, the first polymer can be deformed to contact and in some cases, to immobilize the other fibers in the nonwoven structure. In some cases, the first polymer may at least partially surround the other fibers. In addition, the degree of crystallinity of the polymer within the article may increase as well, which may cause the polymer to become more rigid upon cooling. Also, in some cases, there may be deposition of crystals or spherulites of the polymer within the article, which may also cause the article to become more rigid. After heating, the temperature of the article falls to below the glass transition temperature, and the first polymer becomes more rigid as a result. Accordingly, processes such as these may result in the final article becoming more stiff or rigid, as a result of heating and/or pressure.

In some cases, the article or composite has a degree of rigidity or structural stability such that it is self-supporting, e.g., such that the article or composite can maintain its shape regardless of orientation or positioning of the article or composite, and/or such that the article or composite does not collapse, change its shape, or visually sag under its own weight. In some cases, the article or composite has a specific, defined shape that it tries to return to when perturbed. In addition, in some embodiments, the article or composite may have sufficient structural stability such that it cannot be permanently deformed or bent by an unassisted human being of average strength; for example, the human being may be unable to significantly deform the article or composite, or the human being may be able to deform the article or composite, but upon release, the article or composite returns substantially to its original shape prior to the deformation.

In one embodiment, the rigidity of the material may be determined as long beam flexural strength, which is a measure of the ability of a material to resist deformation under a load. The material may be tested, for example, using a three point flexural test, MIL-STD-401 or SAE-AMS-STD-401, each incorporated herein by reference. For instance, the material may be determined to have a flexural modulus, a Young's modulus, or a tensile strength of at least about 1 GPa, at least about 2 GPa, at least about 3 GPa, at least about 4 GPa, at least about 5 GPa, at least about 6 GPa, at least about 7 GPa, at least about 8 GPa, at least about 9 GPa, at least about 10 GPa, at least about 12 GPa, at least about 14 GPa, at least about 16 GPa, at least about 18 GPa, at least about 20 GPa, etc.

Additionally, in some cases, the article or composite may have a degree of rigidity or structural stability that allows it to bear loads (i.e., weight), in certain embodiments of the invention. For example, the article or composite may be able to bear a certain amount of weight without showing substantial deformation (e.g., deformation that can be readily identified by the naked eye). For example, the article or composite may be able to bear at least about 2, at least about 3, at least about 4, at least about 5, at least about 7, at least about 10, at least about 15, at least about 20, at least about 25, at least about 30, at least about 40, at least about 50, at least about 60, at least about 75, or at least about 100 times its actual weight, e.g., without showing substantial deformation that can be readily identified by the naked eye.

In some cases, the article or composite may be one that can resist indentation. For example, the article or composite may have a hardness, as measured using a Shore durometer, type D, of at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, or at least about 95. In some cases, the hardness may be no more than about 100, no more than about 95, no more than about 90, no more than about 85, no more than about 80, no more than about 75, no more than about 70, no more than about 65, no more than about 60, no more than about 55, no more than about 50, no more than about 45, no more than about 40, no more than about 35, no more than about 30, no more than about 25, no more than about 20, no more than about 15, etc. The hardness may also fall within combinations of these ranges in some instances, e.g., between about 70 and about 90.

The article (and/or the composite comprising the article) may, in some embodiments, have relatively low permeability to gases such as air or other types of gases. As discussed below, having relatively low permeability to gases can allow the nonwoven structure to be relatively flame resistant, and/or to act as acoustic insulation, at least in some cases. For instance, for relatively low permeabilities, the article may have fibers that are relatively tightly arranged, resulting in relatively small pores or spaces between the fibers that would allow gases such as air to pass, and/or the fibers can be relatively large, resulting in spaces between the fibers that are relatively small. In addition, the article can also be relatively thick in some embodiments to slow the passage of gases through the structure. Examples of suitable thicknesses include those described herein.

Accordingly, in one set of embodiments, the article is constructed and arranged, through any suitable combination of thickness, fiber or polymer dimensions, materials, arrangement of fibers and/or polymer, etc. within the article, such that, for a pressure differential of 0.5 inches of water (1 inH$_2$O is 248.84 Pa), the permeability of air through the article is no more than about 100 ft$^3$/min/ft$^2$ at standard pressure and temperature, and in some cases, no more than about 75 ft$^3$/min/ft$^2$, no more than about 50 ft$^3$/min/ft$^2$, no more than about 25 ft$^3$/min/ft$^2$, no more than about 20 ft$^3$/min/ft$^2$, no more than about 15 ft$^3$/min/ft$^2$, no more than about 10 ft$^3$/min/ft$^2$, no more than about 5 ft$^3$/min/ft$^2$, no more than about 3 ft$^3$/min/ft$^2$, no more than about 2 ft$^3$/min/ft$^2$, or no more than about 1 ft$^3$/min/ft$^2$. However, in some embodiments, some gas permeability within the article is desired. For instance, the permeability of air through the article may be at least about 0.5 ft$^3$/min/ft$^2$ under the above-described conditions, and in some cases, at least about 1 ft$^3$/min/ft$^2$, at least about 2 ft$^3$/min/ft$^2$, at least about 3 ft$^3$/min/ft$^2$, at least about 5 ft$^3$/min/ft$^2$, at least about 10 ft$^3$/min/ft$^2$, at least about 15 ft$^3$/min/ft$^2$, at least about 20 ft$^3$/min/ft$^2$, at least about 25 ft$^3$/min/ft$^2$, at least about 25 ft$^3$/min/ft$^2$, at least about 50 ft$^3$/min/ft$^2$, or at least about 75 ft$^3$/min/ft$^2$. Combinations of any of the above permeabilities are also possible in certain cases, e.g., a permeability of greater than about 1 ft$^3$/min/ft$^2$ and less than about 10 ft$^3$/min/ft$^2$. In addition, in some embodiments, the article can also contain compounds that are able to alter its permeability, for example, certain inorganic compounds such as colloidal silica.

In another set of embodiments, the article or composite may have a structure or a porosity such that heat is transmitted through the article or composite preferentially via conduction through fibers or polymers, rather than via convection of gases through pores or voids within the article or composite. Thus, for example, the article or composite can have structure such that heat is preferentially transmitted therethrough via conduction over convection by a factor of at least about 2, at least about 5, at least about 10, at least about 30, at least about 50, at least about 75, at least about 100, at least about 300, at least about 500, at least about 750, at least about 1,000, etc.

In addition, in certain embodiments, the article (and/or the composite comprising the article) is substantially nonflammable, or resistant to flame or fire propagation. As mentioned, this may be achieved, in some embodiments, with articles having relatively small pores, e.g., which may be closed, and/or with articles having relatively small pores or spaces between the fibers. In addition, in some cases, the article may be treated, e.g., chemically. For instance, in one set of embodiments, the article is treated to reduce heat transfer or inhibit or resist the spread of fire therethrough. For example, in some embodiments, any of a variety of flame retardants can be used to treat the article. The flame retardants may added at any suitable point, e.g., before or after formation of a nonwoven structure, or before or after the nonwoven structure is heated and/or pressed to from the article, or before or after the article is formed into a composite. The flame retardants can also be added using any suitable technique. For example, the flame retardants may be sprayed or painted on, a nonwoven structure or article may be dipped or immersed into flame retardant (e.g., contained within a suitable container), the flame retardant may be electrostatically bonded to the nonwoven structure or article, or the like. The fibers, in some cases, can become partially or fully impregnated with the flame retardant, and/or the flame retardant may form a shell or coating around one or more of the fibers. In some instances, the fibers are saturated in flame retardant.

Examples of flame retardants include, but are not limited to, minerals such as aluminum hydroxide, aluminum oxide, aluminum trihydrate, magnesium carbonate hydroxide, magnesium hydroxide, huntite, hydromagnesite, hydrates, red phosphorus, boron compounds such as zinc borate or sodium borate, zinc carbonate, antimony trioxide, antimony pentoxide, sodium antimonate, sodium carbonate, antimony carbonate, aluminum carbonate, etc.; organochlorines such as chlorendic acid derivatives and chlorinated paraffins; organobromines such as polybrominated diphenylethers, decabromodiphenyl ether, decabromodiphenyl ethane, hexabromobutene, dibromoethyl dibromocyclohexane, hexabromocyclododecane, diboromoneopentyl glycol, tribromoneopentyl alcohol, brominated aliphatic polyol, polyethertriol, octabromodiphenyl ether, pentabromodiphenyl ether, fully brominated diphenoxy benzene, decabromodiphenyl ether, octabromodiphenylether, pentabromodiphenylether, (bis-pentabromophenyl)ethane, brominated trimethylphenylindan, tetrabromobisphenol A, bis(tribromophenoxy)ethane, polydibromophenylene oxide, tetrabromophthalic anhydride, 1,2-bis(tetrabromophthalimide)ethane, tetrabromophthalate diols, tetrabromophthalate esters, tetrabromobisphenol A, polydibromophenylene oxide, brominated polystyrene, poly(pentabromobenzyl)acrylate, polymeric brominated compounds such as brominated polystyrenes, brominated carbonate oligomers, brominated epoxy oligomers, tetrabromophthalic anyhydride, tetrabromobisphenol A, hexabromocyclododecane, etc.; sulfamic acid or sulfamates; sulfamides; or organophosphorous or organophosphate compounds such as tris(2,3-dibromopropyl) phosphate, triphenyl phosphate, tris-dichloropropyl phosphate, cresyldiphenyl phosphate, resorcinol bis(diphenylphosphate), bisphenol A bis(diphenyl phosphate), melamine phosphate, tri-o-cresyl phosphate, dimethyl methylphosphonate, phosphinates, tri-m-cresyl phosphate, tris(2-chloropropyl) phosphate, tris-(1.3-dichloro-2-propyl) phosphate, tris(chloroethyl) phosphate, trisdichloropropylphosphate, tri-p-cresyl phosphate, trischloropropylphosphate, tris(chloroisopropyl) phosphate, tri(isopropylphenyl)phosphate, tetrakis(2-chloroethyl) dichloroisopentyldiphosphate, dimethyl methyl phosphonate, 9,10-dihydro-9-oxa-10-phosphaphenanthrene-10-oxide, 6-(2,5-dihydroxyphenyl)-6H-dibenz[c,e][1,2]oxaphosphorine-6-oxide, tetraphenyl resorcinol bis(diphenylphosphate), etc. In addition, combinations of any of these and/or other flame retardants can also be used in other embodiments. For example, the flame retardant that is applied may comprise one, two, three, or more of any of these, and/or other flame retardants.

In addition, the flame retardant may be substantially hydrophobic in some embodiments. For instance, the flame retardant can have a water contact angle of greater than about 75°, greater than about 90°, greater than about 100°, greater than about 120°, greater than about 135°, etc. However, in other embodiments, the flame retardant is not necessarily substantially hydrophobic, or the flame retardant may have water contact angles less than any of these angles.

In addition, under certain conditions, the article may comprise materials that, when ignited, produce low amounts of heat, smoke, and/or flames. For example, in some embodiments, the article may comprise materials that, when heated beyond their thermal decomposition temperatures, form a char or carbon layer during oxidation, and/or produce water as a decomposition by-product. The char or carbon layers may form an insulating portion that reduces or prevents further oxidation from occurring, reduces or prevents smoke from exiting, and/or reduces or prevents heat or flames from penetrating into the article.

Accordingly, in one set of embodiments, the article may be substantially resistant to flames or fires. This may be achieved through a combination of any one or more of the selection of materials forming the fibers of the article, the thickness of the article or composite comprising the article, the conditions under which the article or composite is formed, the porosity or the permeability of gases through the article or composite, the addition of one or more flame retardants, etc.

Thus, in certain embodiments, the article (or composite comprising the article) may show a surprising degree of fire or flame resistance. For example, the article may resist burning or ignition (e.g., when exposed to an open flame). Although articles comprising nonwoven materials have been previously described, such articles typically do not exhibit high degrees of fire or flame resistance, and can easily ignite or burn under the proper conditions. It should be understood that such fire or flame resistance is not created solely through the selection of relatively nonflammable materials or the addition of flame retardants to the article or composite, but also depends on a variety of other factors such as the arrangement of the fibers or polymers, the density of fibers, the permeability, distribution and types of voids, the thickness of the article, and the like. Merely selecting nonflammable materials for use within the article is accordingly not necessarily sufficient to ensure that the resulting article will also be nonflammable.

As an example, in some embodiments, the nonflammability of an article (or composite comprising the article) can be increased by forming an article that exhibit a relatively low degree of permeability to air, or other gases. A simple screening test to identify such articles (or composites) is to create a pressure differential of 0.5 inches of water across an article, placing an open flame on the low pressure side, and determining the open flame increases (e.g., becomes bigger or more intense) due to gas passing across the article, for example, as compared to no such pressure differential. As another example of a screening test, the article (or composite) may be constructed and arranged such that, when substantially the entire outer surface of the article is exposed to a radiant heat flux of 1.7 W/cm$^2$ and an open pilot flame, the article exhibits no flame propagation beyond 2 inches and no flame time beyond 3 seconds after exposure to the open pilot flame for 60 seconds.

Such articles or composites, due to their surprising degree of fire or flame resistance, may be useful in applications where fire safety is of great concern. In some embodiments, such composites may find use in vehicles such as cars, trucks, trains, ships, boats, aircraft, etc., or within buildings (e.g., within construction materials or floor coverings), where there is danger from fire. For example, the article or the composite may satisfy the flammability test defined in 14 C.F.R. § 25(App. F)(VI) (2012), incorporated herein by reference. Such applications are often highly regulated, and many articles or composites cannot meet these tests. However, articles or composites having properties such as those described herein can meet such regulations by controlling various factors such as the selection of nonflammable materials within the nonwoven structure, the porosity or the permeability of the article, the thickness of the article, and the like, as is described herein.

In addition, in some embodiments of the invention, the article (or composite) can also be constructed and arranged to produce relatively low amounts of heat, even if ignited. For example, the article (or composite) may be constructed and arranged such that, when substantially the entire outer surface of the article is exposed to radiant heat of 3.5 W/cm$^2$ and an open pilot flame for 5 minutes, the article produces no more than 65 kW min/m$^2$ of heat. Such properties may be useful, for example, to slow the spread of heat or fire within the article or composite. In addition, in some cases, the article or composite may be constructed and arranged to satisfy the heat release test defined in 14 C.F.R. § 25(App. F)(IV) (2012), incorporated herein by reference.

As previously discussed, the article (or composite) may have a structure or a porosity such that heat is transmitted through the article preferentially via conduction through the fibers or polymers of the article, rather than via convection of gases through the pores or voids of the article. In addition, the fibers or polymers can be formed of materials that have relatively low heat conductivity in some embodiments. For example, the article may comprise a polymer having a thermal conductivity of no more than about 1.2 W/m K, no more than about 1 W/m K, no more than about 0.8 W/m K, no more than about 0.7 W/m K, no more than about 0.6 W/m K, no more than about 0.5 W/m K, no more than about 0.4 W/m K, no more than about 0.3 W/m K, no more than about 0.25 W/m K, no more than about 0.2 W/m K, no more than about 0.15 W/m K, no more than about 0.1 W/m K, no more than about 0.08 W/m K, no more than about 0.06 W/m K, no more than about 0.05 W/m K, no more than about 0.04 W/m K, no more than about 0.03 W/m K, or no more than about 0.02 W/m K, etc.

In addition, the article (or composite) can be constructed and arranged such that, even if ignited, the article does not produce large amounts of smoke, at least in certain embodiments of the invention. Without wishing to be bound by any theory, it is believed that low smoke production may occur both through choice of materials that do not inherently produced large amounts of smoke (e.g., as discussed herein), and/or structural properties that prevent smoke from readily escaping. For example, a composite may comprise an article that contains closed voids that can readily trap smoke to some extent, or the composite may have a relatively low permeability to gases such as air (or other gases, e.g., flammable gases or smoke), as discussed herein.

Articles or composites that do not readily produce smoke can be identified by simple screening tests. As an example, the article or composite can be ignited using any suitable technique, and the smoke produced thereby determined. For instance, the article or composite may be placed within a suitable container and ignited to produce smoke. The smoke may be determined visually, or by using suitable measurement techniques. For example, the optical density of a beam of light traveling 900 mm through the smoke may be determined. As an example, if the beam of light exhibits a specific optical density of no more than about 200 Ds after travelling through the container, the article or composite can be considered to be one that does not readily emit smoke.

As with fire or flame resistance, articles or composites that do not emit substantial amounts of smoke when ignited may be particularly useful in applications where fire safety is of great concern. Thus, such articles and composites can be used in applications such as the ones previously discussed. In some cases, the article or composite may be constructed and arranged to satisfy the smoke emission test defined in 14 C.F.R. § 25(App. F)(V) (2012), ASTM F814-83, and/or ASTM E906 (Standard Test Method for Heat and Visible Smoke Release Rates for Materials and Products Using a Thermopile Method), each incorporated herein by reference.

In addition, in some embodiments, the article (or composite) may have a relatively high degree of soundproofing or acoustic insulation. In some embodiments, a relatively high degree of soundproofing or acoustic insulation is achieved using articles that do not have high permeabilities to air or other gases; since sound waves typically travel through air, articles having relatively low permeabilitys to air may, in some cases, exhibit a high degree of soundproofing or acoustic insulation. The mass of the article and/or its thickness may also affect the degree of soundproofing in some instances, e.g., thicker materials in general produce better acoustic insulation. However, it should be noted that some permeability may be required in certain cases, since articles that are too solid or have too little air permeability may effectively as a solid block of material with respect to acoustic waves and allow more sound transmission to occur. Accordingly, merely selecting materials for the article that have relatively low permeability to air is not necessarily sufficient to guarantee that the resulting article will be soundproof or act as a suitable acoustic insulator.

Acoustic insulation of a material can be determined, for example, as acoustic absorption (i.e., the absorption of sound waves into the material), and/or as acoustic transmission (i.e., the degree to which sound waves can pass through the material). Acoustic absorption is typically measured at specific frequencies. For instance, in one set of embodiments, the article (or composite) has sufficient acoustic absorption such that, for sound at a frequency of 500 Hz (e.g., a sine wave), at least about 10% of the sound is absorbed by the article, and in some cases, at least about 20%, at least about 30%, at least about 40%, at least about 50%, at least about 60%, at least about 70%, or at least about 80% of the sound is absorbed by the article. In some cases, the article is sufficiently soundproof such that, for sound at a frequency of 1 kHz, at least about 10% of the sound is absorbed by the article, and in some cases, at least about 20%, at least about 30%, at least about 40%, at least about 50%, at least about 60%, at least about 70%, or at least about 80% of the sound is absorbed by the article. In certain instances, the article is sufficiently soundproof such that, for sound at a frequency of 1.5 kHz or 2.5 kHz, at least about 10% of the sound is absorbed by the article, and in some cases, at least about 20%, at least about 30%, at least about 40%, at least about 50%, at least about 60%, at least about 70%, or at least about 80% of the sound is absorbed by the article. In one set of embodiments, for sound that is evenly distributed between 20 Hz and 20 kHz, the article is able to absorb at least about 20%, at least about 30%, at least about 40%, or at least about 50% of the sound. In some cases, the article is constructed and arranged to absorb at least about 70% of sound having a frequency of 500 Hz that is directed at the article. In some cases, however, no more than about 95%, no more than about 90%, no more than about 85%, no more than about 80%, no more than about 75%, or no more than about 70% of the sound is absorbed for any of the ranges described above.

In another set of embodiments, the article may be able to prevent at least some sound waves from passing through the article. For example, the sound waves may reflected, absorbed, diffused, etc. by the article. In one set of embodiments, the article may cause a reduction in acoustic transmission for a sound wave of about 500 Hz of about 5 dB or more, 10 dB or more, 15 dB or more, 20 dB or more, 25 dB or more, 30 dB or more, 35 dB or more, or 40 dB or more. In some cases, the article may cause a reduction in acoustic transmission for a sound wave of about 1.5 kHz or 2.5 kHz of about 5 dB or more, 10 dB or more, 15 dB or more, 20 dB or more, 25 dB or more, 30 dB or more, 35 dB or more, or 40 dB or more.

Non-limiting examples of testing methods that can be used to determine acoustic absorption and/or acoustic transmission, e.g., at levels such as those discussed above, include ASTM E1050 (Standard Test Method for Impedance and Absorption of Acoustical Materials Using a Tube, Two Microphones and a Digital Frequency Analysis System), ASTM E2611 (Standard Test Method for Measurement of Normal Incidence Sound Transmission of Acoustical Materials Based on the Transfer Matrix Method), ASTM C522 (Standard Test Method for Airflow Resistance of Acoustical Materials), ASTM C423 (Standard Test Method for Sound Absorption and Sound Absorption Coefficients by the Reverberation Room Method), or ASTM E90 or ASTM E90-2 (Standard Test Method for Laboratory Measurement of Airborne Sound Transmission Loss of Building Partitions and Elements), each of which is incorporated herein by reference. In addition, in some embodiments, the article can be both relatively flame resistant and acoustically insulating.

In another set of embodiments, the article (or composite comprising the article) may be treated with an antimicrobial agent. Any of a wide variety of antimicrobial agents may be used, including antibacterials, antifungals, antiseptics, or the like. The antimicrobial agents can be added, for example, to the nonwoven structure before and/or after the nonwoven structure has been formed, before or after the nonwoven structure has been heated and/or pressed to from the article, or the nonwoven structure, after formation, may be exposed to antimicrobials by any suitable technique, such as spraying or dipping.

Examples of antimicrobial agents include, but are not limited to, organic acids such as lactic acid, citric acid, acetic acid, and their salts; metals such as copper or silver (e.g., which may be impregnated within polymers such as those contained within the composite); Silpure (which also contains silver) or Ultra-Fresh DM-50 (Thompson Research); or oils such as cinnamon oil, clove oil, eucalyptus oil, garlic oil, oregano oil, lavender oil, leleshwa oil, lemon oil, lemon myrtle oil, mint oil, neem oil, black cumin oil, onion oil, peppermint oil, sandalwood oil, ironwort, tea tree oil, or thyme oil. Examples of antibacterials and antiseptics include, but are not limited to, alcohols; quaternary ammonium compounds such as benzalkonium chloride, cetyl trimethylammonium bromide, cetylpyridinium chloride, benzethonium chloride, chlorhexidine, octenidine; boric acid; aldehydes such as formaldehyde and glutaraldehyde; or phenolics such as phenol, o-phenylphenol, chloroxylenol, hexachlorophene, thymol, or the like. Non-limiting examples of antifungals include tea tree oil, cinnamaldehyde, cinnamon essential oil, jojoba oil, neem oil, rosemary oil, monocerin, or the like.

In another set of embodiments, the article (or composite comprising the article) is hydrophobic, or is treated to render it hydrophobic. For example, the article may have a water contact angle of greater than about 75°, greater than about 90°, greater than about 100°, greater than about 120°, greater than about 135°, etc. Examples of suitable treatments include, but are not limited to, fluorinated hydrocarbons (e.g., having 5, 6, 7, or 8 carbons) such as fluoroalkyl esters, perfluoroacrylates, trifluorinated hydrocarbons, tetrafluorinated hydrocarbons, fluorinated acrylates, perfluoroacrylates, silicones such as reactive organosilicones, polysiloxanes such as polydimethylsiloxanes or polymethylhydrogensiloxanes, or the like. However, in other embodiments, the article is not necessarily substantially hydrophobic, and/or the article may have water contact angles less than any of these angles. In one set of embodiments, the article (or composite comprising the article) is hydrophobic or water-repellent, and/or is treated such that it absorbs less than 4% water by weight after 96 hours, e.g., as discussed in the ASTM D2842 water absorption test (Standard Test Method for Water Absorption of Rigid Cellular Plastics), incorporated herein by reference.

Another aspect of the present invention is generally directed to systems and methods for preparing articles and composites comprising such articles, e.g., as described herein. As previously discussed, in one set of embodiments, an article may be prepared by forming a nonwoven structure from one or more types of fibers, e.g., by entangling the fibers, and then applying suitable temperatures and/or pressures to form the article. Furthermore, in some cases, materials such as flame retardants, antimicrobial agents, resin, foams, other woven or nonwoven structures, or the like may be added; any one or more of these may be added at any suitable point, e.g., before or after formation of the article or composite, before or after formation of the nonwoven structure, etc. In addition, in some cases, an article may be further heated and/or compressed with other materials, for example, to form a composite. For example, a woven structure may be needled into a nonwoven structure before the nonwoven structure is heated and/or compressed to from a composite.

The nonwoven structure may be formed from any of a wide variety of fibers, and the nonwoven structure may be formed using any suitable technique known in the art. The nonwoven structure can comprise any number of fiber types that are entangled together (e.g., without weaving) to form the nonwoven structure. For instance, the nonwoven structure may include one, two, three, or more types of fibers, e.g., having different compositions, lengths, diameters, densities, etc. In some cases, the nonwoven structure is formed as a substantially planar structure.

In addition, in some embodiments, the nonwoven structure comprises fibers having one or more "weights," or more accurately, mass densities. For example, the nonwoven structure may comprise fibers having an average linear mass density of about 20 Denier or less, about 18 Denier or less, about 16 Denier or less, about 15 Denier or less, about 14 Denier or less, about 13 Denier or less, about 12 Denier or less, about 11 Denier or less, about 10 Denier or less, about 9 Denier or less, about 8 Denier or less, about 7 Denier or less, about 6 Denier or less, about 5 Denier or less, about 4 Denier or less, about 3 Denier or less, about 2.5 Denier or less, about 2 Denier or less, about 1.5 Denier or less, about 1 Denier or less, about 0.5 Denier or less, about 0.3 Denier or less, about 0.2 Denier or less, about 0.1 Denier or less, or about 0.05 Denier or less. (1 Denier is the mass in grams for 9,000 linear meters of fiber; expressed as a ratio, this becomes an average linear mass density of the fiber.) In some cases, the nonwoven structure comprises fibers having average linear mass densities of at least about 0.05 Denier, at least about 0.1 Denier, at least about 0.2 Denier, at least about 0.3 Denier, at least about 0.5 Denier, at least about 1 Denier, at least about 1.5 Denier, at least about 2 Denier, at least about 2.5 Denier, at least about 3 Denier, at least about 4 Denier, at least about 5 Denier, at least about 6 Denier, at least about 7 Denier, at least about 8 Denier, at least about 9 Denier, at least about 10 Denier, at least about 11 Denier, at least about 12 Denier, at least about 13 Denier, at least about 14 Denier, at least about 15 Denier, at least about 16 Denier, about 18 Denier, etc. Suitable combinations of any of these are also contemplated in other embodiments of the invention, e.g., the nonwoven structure may comprise first fibers having an average linear mass density of greater than about 2 Denier and less than about 6 Denier. In addition, the densities may be substantially the same, or there may be a range of densities present, for fibers with substantially the same composition within the nonwoven structure.

If more than one type of fiber is present in the nonwoven material, the fibers can independently have the same or different average linear mass densities, including any of the values described herein. As non-limiting examples, the nonwoven material may comprise first fibers having an average linear mass density of about 8 Denier and second fibers having an average linear mass density of 4 Denier, first fibers having an average linear mass density of about 8 Denier and second fibers having an average linear mass density of 2 Denier, first fibers having an average linear mass density of about 16 Denier and second fibers having an average linear mass density of 8 Denier, first fibers having an average linear mass density of about 2 Denier and second fibers having an average linear mass density of 1.5 Denier, first fibers having an average linear mass density of between about 2 Denier and about 6 Denier and second fibers having an average linear mass density of between about 12 Denier and about 20 Denier, etc.

The fibers within the nonwoven structure may also have any suitable diameter/smallest cross-sectional dimension. As non-limiting examples, the nonwoven structure can comprise fibers having an average diameter of less than about 500 micrometers, less than about 400 micrometers, less than about 300 micrometers, less than about 200 micrometers, less than about 100 micrometers, less than about 90 micrometers, less than about 80 micrometers, less than about 70 micrometers, less than about 60 micrometers, less than about 50 micrometers, less than about 40 micrometers, less than about 30 micrometers, less than about 25 micrometers, less than about 20 micrometers, less than about 15 micrometers, less than about 10 micrometers, less than about 5 micrometers, less than about 1 micrometer, etc. In some embodiments, the fibers may have an average diameter of at least about 1 micrometer, at least about 5 micrometers, at least about 10 micrometers, at least about 15 micrometers, at least about 20 micrometers, at least about 25 micrometers, at least about 30 micrometers, at least about 40 micrometers, at least about 50 micrometers, at least about 60 micrometers, at least about 70 micrometers, at least about 80 micrometers, at least about 90 micrometers, at least about 100 micrometers, at least about 200 micrometers, at least about 300 micrometers, at least about 400 micrometers, etc. Suitable combinations of any of these are also contemplated in some embodiments of the invention, e.g., one of the fibers may have a diameter of between about 50 micrometers and 100 micrometers. If more than one type of fiber is present in the nonwoven material, the fibers independently can have the same or different diameters. In addition, the diameters may be substantially the same, or there may be a range of diameters for fibers with substantially the same composition within the nonwoven structure. Also, fibers having different diameters within a nonwoven structure can independently have the same or different compositions.

The fibers within the nonwoven structure can also have any suitable length, and the lengths of the fibers may be substantially the same, or there may be a range of lengths present within the nonwoven structure for fibers with substantially the same composition. For example, the fibers may have a length of about 15 inches or less, about 12 inches or less, about 11 inches or less, about 10 inches or less, about 9 inches or less, about 8 inches or less, about 7 inches or less, about 6 inches or less, about 5 inches or less, about 4 inches or less, about 3 inches or less, about 2 inches or less, or about 1 inch or less, depending on the embodiment. (1 inch is 25.4 mm.) In some embodiments, the fibers may also have a length of at least about 1 inch, at least about 2 inches, at least about 3 inches, at least about 4 inches, at least about 5 inches, at least about 6 inches, at least about 7 inches, at least about 8 inches, at least about 9 inches, at least about 10 inches, at least about 11 inches, at least about 12 inches, etc., and/or combinations of any of these (e.g., the fibers within the nonwoven structure may have a length of between about 3 inches and about 8 inches). If more than one fiber type is present in the nonwoven material, the fiber types can independently have the same or different lengths. Fibers having different lengths within a nonwoven structure can also independently have the same or different compositions. In addition, the lengths may be substantially the same, or a range of lengths may be present for fiber types with substantially the same composition within the nonwoven structure.

The nonwoven structure may include, in some cases, more than one type of fiber, e.g., a first fiber comprising the first polymer, and a second fiber as previously discussed. The first fiber and the second fiber may be present within the nonwoven structure at any suitable ratio of masses. For instance, the ratio may be between about 50:1 and about 1:50, between about 40:1 and about 1:40, between about 30:1 and about 1:30, between about 20:1 and about 1:20, between about 10:1 and about 1:10, between about 5:1 and about 1:5, etc., or the ratio may be between about 50:1 and about 1:1, between about 40:1 and about 1:1, between about 30:1 and about 1:1, between about 20:1 and about 1:1, between about 10:1 and about 1:1, between about 5:1 and about 1:1, between about 2:1 and about 1:1, etc.

However, it should be understood that the first polymer need not be present as first polymer fibers. In other embodiments of the invention, the first polymer is present in other suitable forms. For instance, the first polymer can be present as particles or microparticles, or the first polymer may be placed on top of the fibers forming the nonwoven material, e.g., as a sheet of material, as a film of material, as another nonwoven material, as a woven material, as a knit material, etc. In some case, more than one such form may be present. In some cases, the first polymer comprises at least about 5% of the material within the nonwoven material, and in some cases, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of the material within the nonwoven material. However, in some cases, the first polymer may comprise no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, no more than about 15%, no more than about 10%, or no more than about 5% of all of the material within the nonwoven structure. Combinations of these are also possible in some cases, e.g., the first polymer can form between about 30% and about 65% of the material within the nonwoven structure.

The nonwoven structure, when formed, may have any suitable thickness, weight, or density. For example, the thickness of the nonwoven structure, or the smallest dimension of the nonwoven structure, may be about 0.01 inches, about 0.02 inches, about 0.03 inches, about 0.04 inches, about 0.05 inches, about 0.06 inches, about 0.07 inches, about 0.08 inches, about 0.09 inches, about 0.1 inches, about 0.25 inches, about 0.5 inches, about 0.75 inches, about 1 inch, about 1.25 inches, about 1.5 inches, about 1.75 inches, about 2 inches, about 2.25 inches, about 2.5 inches, about 2.75 inches, about 3 inches, about 3.5 inches, about 4 inches, about 4.5 inches, about 5 inches, about 6 inches, about 7 inches, about 8 inches, about 9 inches, about 10 inches, about 12 inches, etc. As other non-limiting examples, the nonwoven structure can have a density of about 5 $oz/yd^2$ or more, about 10 $oz/yd^2$ or more, about 15 $oz/yd^2$ or more, about 20 $oz/yd^2$ or more, about 25 $oz/yd^2$ or more, about 30 $oz/yd^2$ or more, about 40 $oz/yd^2$ or more, about 50 $oz/yd^2$ or more, about 60 $oz/yd^2$ or more, about 70 $oz/yd^2$ or more, about 80 $oz/yd^2$ or more, about 90 $oz/yd^2$ or more, about 100 $oz/yd^2$ or more, about 110 $oz/yd^2$ or more, about 120 $oz/yd^2$ or more, about 125 $oz/yd^2$ or more, about 150 $oz/yd^2$ or more, about 175 $oz/yd^2$ or more, about 200 $oz/yd^2$ or more, about 225 $oz/yd^2$ or more, about 250 $oz/yd^2$ or more, about 275 $oz/yd^2$ or more, about 300 $oz/yd^2$ or more, about 350 $oz/yd^2$ or more, about 400 $oz/yd^2$ or more, about 450 $oz/yd^2$ or more, about 500 $oz/yd^2$ or more, about 550 $oz/yd^2$ or more, about 600 $oz/yd^2$ or more, about 650 $oz/yd^2$ or more, about 700 $oz/yd^2$ or more, about 750 $oz/yd^2$ or more, about 800 $oz/yd^2$ or more, about 850 $oz/yd^2$ or more, about 900 $oz/yd^2$ or more, about 1,000 $oz/yd^2$ or more, etc. (1 oz is 28.3495 g and 1 yd is 0.9144 m).

The nonwoven structure may be prepared, in some embodiments, by entangling one or more types of fibers, e.g., as discussed herein. The fibers used to form the nonwoven structure can be entangled together using various techniques, although the fibers are typically not knitted or weaved together, e.g., as in a fabric material. Examples of suitable techniques include, but are not limited to, needlepunching or needlefelting, thermal bonding, hydroentaglement, ultrasonic bonding, or chemical bonding. Using techniques such as these, the fibers forming the nonwoven structure can be entangled together to form the nonwoven structure. If more than one type of fiber is present, the fibers may be mixed together prior to forming the nonwoven structure, e.g., mechanically. In addition, in some embodiments, the fibers may be substantially aligned, or carded or combed together, prior to forming the nonwoven structure.

For example, in one set of embodiments, the fibers are entangled together to form the nonwoven structure using thermal bonding techniques. The fibers may be placed together and heated to form the nonwoven structure. For instance, in some cases, heat sealers or ovens may be applied to the fibers, and/or the fibers may be calendered through heated rollers (optionally under pressure) in order to form the nonwoven structure. In hydroentaglement, the fibers are entangled together to form the nonwoven structure using water jets. The fibers may also be entangled together using air instead of water, in some embodiments, optionally using ultrasound. Fibers may also be entangled together in chemical bonding techniques using latex emulsion or solution polymers to chemically assemble the fibers into a nonwoven structure. In some cases, binder fibers or powders can also be used to soften or partially melt the fibers to form the nonwoven structure.

In needlepunching or needlefelting, a plurality of needles, typically solid, are used to mechanical entangle or intertwine individual fibers together to form the nonwoven structure. This can be done, for example, by mechanically moving or "punching" the needles repeatedly up and down over the fibers to entangle the fibers together to form the nonwoven structure. In some cases, this may be done at relatively high densities, e.g., at least about 1 insertion/$in^2$, at least about 3 insertions/$in^2$, at least about 5 insertions/$in^2$, at least about 10 insertions/$in^2$, at least about 30 insertions/$in^2$, at least about 50 insertions/$in^2$, at least about 100 insertions/$in^2$, at least about 300 insertions/$in^2$, at least about 500 insertions/ in², at least about 1,000 insertions/in², at least about 3,000 insertions/in², at least about 5,000 insertions/in², at least about 10,000 insertions/in², at least about 30,000 insertions/in², at least about 50,000 insertions/in², at least about 100,000 insertions/in², at least about 300,000 insertions/in², at least about 500,000 insertions/in², at least about 1,000,000 insertions/in², etc. In some cases, there may be no more than about 1,000,000 insertions/in², no more than about 500,000 insertions/in², no more than about 300,000 insertions/in², no more than about 100,000 insertions/in², no more than about 50,000 insertions/in², no more than about 30,000 insertions/in², no more than about 10,000 insertions/in², no more than about 5,000 insertions/in², no more than about 3,000 insertions/in², no more than about 1,000 insertions/in², no more than about 500 insertions/in², no more than about 300 insertions/in², no more than about 100 insertions/in², no more than about 50 insertions/in², no more than about 30 insertions/in², no more than about 10 insertions/in², etc. Combinations of any of these are also possible in certain embodiments.

In some embodiments, the nonwoven structure is heated to form the final article. As previously discussed, the nonwoven structure may contain a first polymer that is to be heated to a temperature greater than the glass transition temperature but less than the melting temperature of the first polymer. For example, one set of embodiments is generally directed to a method comprising entangling first fibers and second fibers together to form a nonwoven structure, where the first fibers comprise a first polymer and the second fibers comprise a second polymer, and heating at least a portion of the nonwoven structure to a temperature that is greater than or equal to the glass transition temperature of the first polymer, less than or equal to the melting temperature of the first polymer, and less than or equal to the melting temperature of the second polymer. As an example, an article may comprise a first polymer and fibers comprising a second polymer, where the nonwoven structure is formed by heating at least a portion of the nonwoven structure to a temperature that is greater than or equal to the glass transition temperature of the first polymer, less than or equal to the melting temperature of the first polymer, and less than or equal to the glass transition temperature, the melting temperature, or the decomposition temperature of the second polymer. In some cases, the article has a nonwoven structure. In addition, in some cases, an article as discussed herein may also be subject to applied pressure before, during, and/or after the article is heated. This may be used in some cases to shape or mold the article, e.g., into a desired shape and/or thickness and/or density and/or porosity.

Any suitable technique may be used to heat the nonwoven structure. Examples of suitable techniques include, but are not limited to, heating within an oven or other enclosed temperature controlled environment, electrically resistive heating, radiative heating, exposure to radiation (e.g., infrared radiation), application of heat sources, e.g. via direct surface contact, to the nonwoven structure, or the like.

In some embodiments, the nonwoven structure is heated to a temperature greater than the glass transition temperature but less than the melting temperature of the first polymer. In some cases, the temperature may also be no more than about 10° F., no more than about 20° F., no more than about 30° F., no more than about 40° F., no more than about 50° F., no more than about 60° F., no more than about 80° F., no more than about 100° F., no more than about 125° F., no more than about 150° F., no more than about 175° F., or no more than about 200° F. below the melting temperature of the first polymer. However, in certain instances, the temperature may be at least about 10° F., at least about 20° F., at least about 30° F., at least about 40° F., at least about 50° F., at least about 60° F., at least about 80° F., at least about 100° F., at least about 125° F., at least about 150° F., at least about 175° F., or at least about 200° F. above the glass transition temperature of the first polymer. Combinations of these are also possible in certain embodiments; for example, the temperature can be at least 20° F. above the glass transition temperature and 20° F. below the melting temperature.

Additionally, the nonwoven structure, in some cases, is heated to a temperature of at least about 60° F., at least about 80° F., at least about 100° F., at least about 120° F., at least about 140° F., at least about 160° F., at least about 180° F., at least about 200° F., at least about 220° F., at least about 240° F., at least about 260° F., at least about 280° F., at least about 300° F., at least about 325° F., at least about 350° F., at least about 375° F., at least about 400° F., at least about 425° F., at least about 435° F., at least about 450° F., at least about 475° F., at least about 500° F., at least about 525° F., at least about 550° F., at least about 575° F., at least about 600° F., etc. However, in some cases, the temperature may be no more than about 900° F., no more than about 850° F., no more than about 800° F., no more than about 750° F., no more than about 700° F., no more than about 650° F., no more than about 600° F., no more than about 550° F., no more than about 500° F., no more than about 450° F., no more than about 400° F., no more than about 375° F., no more than about 350° F., no more than about 325° F., no more than about 300° F., no more than about 280° F., no more than about 260° F., no more than about 240° F., no more than about 220° F., no more than about 200° F., no more than about 180° F., no more than about 160° F., no more than about 140° F., no more than about 120° F., no more than about 100° F., no more than about 80° F., etc. In some embodiments of the invention, the temperature may also be heated to a temperature that is within any of these values, e.g., between about 100° F. and about 200° F. Thus, as a non-limiting example, one set of embodiments is generally directed to a method comprising entangling first fibers and second fibers together to form a nonwoven structure, and heating at least a portion of the nonwoven structure to a temperature of between about 435° F. and about 700° F. For instance, in one embodiment, the invention is directed to a method comprising entangling first fibers and second fibers together to form a nonwoven structure, wherein the first fibers comprise poly(paraphenylene terephthalamide) and the second fibers comprising polyetherimide, and heating at least a portion of the nonwoven structure to a temperature of between about 435° F. and about 700° F.

In certain embodiments, heat can be applied to substantially all or only a portion of the nonwoven structure, depending on the application. Thus, for example, the nonwoven structure can be substantially uniformly heated, or different portions of the nonwoven structure may be subjected to different temperatures, e.g., any of the temperatures described herein. As a non-limiting example, in one set of embodiments, a first surface of the nonwoven structure is heated to a first temperature, and a second surface of the nonwoven structure is heated to a second temperature different from the first temperature. The first and second temperatures may each independently be any of the temperatures given above. In some cases, the first temperature may be at least about 10° F., at least about 20° F., at least about 30° F., at least about 40° F., at least about 50° F., at least about 60° F., at least about 80° F., at least about 100° F., at least about 125° F., at least about 150° F., at least about 175° F., or at least about 200° F. greater than the second temperature. In addition, in certain embodiments, the first temperature may be no more than about 225° F., no more than about 200° F., no more than about 175° F., no more than about 150° F., no more than about 125° F., no more than about 100° F., no more than about 80° F., no more than about 60° F., no more than about 50° F., no more than about 40° F., no more than about 30° F., or no more than about 20° F. greater than the second temperature. Combinations of any of these ranges or temperatures are also possible in some embodiments.

In addition, in some embodiments, pressure may be applied to the nonwoven structure to form the final article, instead of or in addition to heating. In some cases, heating and pressing can occur simultaneously, or at least partially overlap in time. In other cases, heating and pressing occur sequentially. Any suitable technique may be used to apply pressure to the nonwoven structure and the foam, including applying the pressure pneumatically, mechanically, hydraulically, and/or placing the nonwoven structure and the foam in a high-pressure gas chamber. In addition, in some cases, the pressure may be at least partially internally generated. Without wishing to be bound by any theory, in some embodiments, the first polymer or the second polymer may shrink upon heating, i.e., increasing its density or specific gravity, and also creating internal pressures within the nonwoven structure that may affect formation of articles.

The pressure may be applied to substantially all or only a portion of the nonwoven structure, depending on the application. In one set of embodiments, the applied pressure may be at least about 5 psi (gauge pressure), at least about 10 psi, at least about 25 psi, at least about 50 psi, at least about 100 psi, at least about 125 psi, at least about 150 psi, at least about 200 psi, at least about 250 psi, at least about 300 psi, at least about 400 psi, at least about 500 psi, at least about 600 psi, at least about 700 psi, at least about 800 psi, at least about 900 psi, at least about 1,000 psi, at least about 1,250 psi, at least about 1,500 psi, at least about 1,750 psi, at least about 2,000 psi, at least about 2,250 psi, at least about 2,500 psi, at least about 2,500 psi, at least about 2,750 psi, at least about 3,000 psi, at least about 3,500 psi, at least about 4,000 psi, at least about 4,500 psi, at least about 5,000 psi, etc. (1 psi is 6894.757 Pa.) The pressure may also be, in some embodiments, no more than about 4,500 psi, no more than about 4,000 psi, no more than about 3,500 psi, no more than about 3,000 psi, no more than about 2,750 psi, no more than about 2,500 psi, no more than about 2,500 psi, no more than about 2,250 psi, no more than about 2,000 psi, no more than about 1,750 psi, no more than about 1,500 psi, no more than about 1,250 psi, no more than about 1,000 psi, no more than about 900 psi, no more than about 800 psi, no more than about 700 psi, no more than about 600 psi, no more than about 500 psi, no more than about 400 psi, no more than about 300 psi, no more than about 250 psi, no more than about 200 psi, no more than about 150 psi, no more than about 125 psi, no more than about 100 psi, no more than about 50 psi, no more than about 25 psi, no more than about 10 psi, etc. In addition, the pressure can be contained within any of these values, e.g., a pressure of between about 100 psi and about 400 psi. Furthermore, in some embodiments, different portions of the nonwoven structure may be subjected to different pressures, e.g., any of the pressures described above.

In some cases, the application of heat and/or pressure may be used to cause a change in density of the nonwoven structure and/or the degree of crystallinity within a polymer within the nonwoven structure. For example, the degree of crystallinity within the polymer may increase by at least about 5%, at least about 10%, at least about 15%, at least about 20%, at least about 25%, etc., and/or the crystallinity may increase by no more than about 30%, no more than about 25%, no more than about 20%, no more than about 15%, no more than about 10%, etc. The density or specific gravity of the nonwoven structure after applying heat and/or pressure may increase by at least about 3%, by at least about 5%, by at least about 10%, by at least about 15%, by at least about 20%, by at least about 25%, by 30%, by at least about 40%, by at least about 50%, by at least about 60%, by at least about 70%, by at least about 80%, by at least about 90%, by at least about 100%, by at least about 125%, by at least about 150%, by at least about 175%, by at least about 200%, by at least about 250%, by at least about 300%, by at least about 350%, by at least about 400%, by at least about 450%, by at least about 500%, etc., relative to the initial density before heating.

Thus, as a non-limiting example, in one set of embodiments, a method of the invention may include acts of mixing a material comprising polyetherimide and fibers comprising poly(paraphenylene terephthalamide) together to form a solid mixture, heating at least a portion of the solid mixture to a temperature of between about 435° F. and about 700° F., and compressing at least a portion of the solid mixture to a pressure of at least about 5 psi (gauge).

Such heat and/or pressures may be applied for any suitable time. The heat and/or pressure may be steadily applied, or in some cases, the heat and/or pressure may vary with respect to time. If both heat and pressure are used, the times each are applied may be the same or different, and can be, for example, about 1 minute or more, about 2 minutes or more, about 3 minutes or more, about 4 minutes or more, about 5 minutes or more, about 6 minutes or more, about 7 minutes or more, about 8 minutes or more, about 9 minutes or more, about 10 minutes or more, about 12 minutes or more, about 15 minutes or more, about 20 minutes or more, about 25 minutes or more, about 30 minutes or more, about 35 minutes or more, about 40 minutes or more, about 45 minutes or more, about 50 minutes or more, about 55 minutes or more, about 60 minutes or more, etc.

In some embodiments, other processes can also be applied to a nonwoven structure or an article, e.g., to increase its rigidity or structural stability, in addition or instead of heating and/or pressure. Examples include, but are not limited to, electromagnetic energy (e.g., thermal, ultraviolet radiation), acoustical energy (e.g., ultrasonic energy), chemical enhancement (e.g., salting with other crystal structures, resins, etc.), and/or physical manipulation (e.g., elongation, compaction, stretching, etc.). One or more of these processes may be applied to the nonwoven structure before, during, or after the nonwoven structure is formed. In some cases, these may be applied serially or simultaneously, etc.

For example, in one set of embodiments, ultrasound is applied to the nonwoven structure or the article. The ultrasound may have any suitable frequency, e.g., at least about 15 kHz, at least about 20 kHz, at least about 25 kHz, at least about 30 kHz, at least about 35 kHz, at least about 40 kHz, at least about 45 kHz, at least about 50 kHz, or the like, and may be applied using any suitable technique, e.g., an ultrasonic transducer such as those commercially available. In some cases, the frequency is no more than about 60 kHz, no more than about 50 kHz, no more than about 45 kHz, no more than about 40 kHz, no more than about 35 kHz, no more than about 30 kHz, no more than about 25 kHz, no more than about 20 kHz, etc. In addition, the power may be at least about 50 W, at least about 75 W, at least about 100

W, at least about 150 W, at least about 200 W, etc. The ultrasound can also be applied for any length of time, e.g., for about 5 minutes or more, about 10 minutes or more, about 12 minutes or more, about 15 minutes or more, about 20 minutes or more, about 25 minutes or more, about 30 minutes or more, about 35 minutes or more, about 40 minutes or more, about 45 minutes or more, about 50 minutes or more, about 55 minutes or more, about 60 minutes or more, etc.

As another example, in some cases, a resin may be added to the nonwoven structure to increase its rigidity. Examples of resins that can be used include, but are not limited to, phenolic resins, acetal resin, acrylic resins, polyetheretherketone resins, polyester resins such as unsaturated polyester resins, polyphenelene sulfide resins, polyetherimide resin, melamine resins, epoxy resins, silica resins, urethane resins, solvent impregnated resins, or the like.

As mentioned, other materials or layers may be attached or immobilized to the article to form a composite. Any suitable technique may be used to attach or immobilize the other materials or layers to the article. For example, a foam or other material may be joined to a nonwoven structure, or to an article after formation of the article. As another example, one or more woven structures may be attached or immobilized to the nonwoven structure, e.g., via adhesion, needling, quilting, stichbonding, enveloping, or the like, e.g., as discussed herein. The woven structures may have the same or different fiber composition than the nonwoven structure. Other materials that may be joined to articles, and/or to each other within the composite, include other nonwoven structures, backing or protective layers or materials, layers or materials that provide structural support or flexibility to the composite, layers or materials to provide flame resistance and/or thermal and/or acoustic insulation, etc. Additional woven or nonwoven structures, if present, may be formed from any of the fibers discussed herein, and have any lengths, diameters, densities, etc. described herein with respect to nonwoven structures, in various embodiments of the invention. In addition, any suitable technique may be used for attaching or immobilizing these materials, and in some cases, more than one technique may be used. Examples include, but are not limited to, adhesives or needling.

For example, in one set of embodiments, the article is combined with other materials such as bulk bolding materials, FRP (fiberglass reinforced panels) sheets, pre-pregs, veils, or the like to form the composite. In some cases, the pre-preg may comprise carbon fibers, fiberglass fibers, woven or nonwoven materials, etc. that are impregnated with resins such as epoxy resins, phenolic resins, or other resins such as those described herein. Thus, for instance, the article may be present as a core or layer within a pre-preg composite.

For example, an adhesive may be used to attach or immobilize the materials together. Non-limiting examples of adhesives include epoxies, heat-sensitive adhesives, monomer- or polymer-based glues such as, but not limited to, acrylates, acrylonitriles, cyanoacrylates, acrylics, resorcinol glue, epoxy resins, epoxy putties, ethylene-vinyl acetates, nylons, olefins, phenol formaldehyde resins, polyamides, polyesters, polyester resins, polyethylenes, polypropylenes, polysulfides, polyurethanes, polyvinyl acetates, polyvinyl alcohols, polyvinyl chlorides and polyvinyl chloride emulsions, polyvinylpyrrolidones, rubber cements, silicones, styrene acrylic copolymers, or the like. As another example, in one set of embodiments, the adhesive is a pressure-sensitive adhesive. In some embodiments, the pressure-sensitive adhesive may comprise a polymer and a resin. The resin may be, for example, a rosin or a rosin derivative, a terpene or a modified terpene, an aliphatic, cycloaliphatic, or aromatic resins (e.g., $C_5$ aliphatic resins, $C_9$ aromatic resins, etc.), a hydrogenated hydrocarbon resin, silicate resins such as monofunctional trimethyl silanes reacted with quadrafunctional silicon tetrachloride, or a mixture of these any/or other resins (for example, a terpene-phenol resin). Examples of suitable polymers for the adhesive include, but are not limited to, acrylics, butyl rubber, ethylene vinyl acetate, natural rubber, nitriles, silicone rubbers, styrene block copolymers, styrene-butadiene-styrene copolymers, styrene-ethylene/butylene-styrene copolymers, styrene-ethylene/propylene copolymers, styrene-isoprene-styrene copolymers, and the like.

However, not all embodiments of the invention require the use of adhesives. For instance, in another set of embodiments, needling techniques may be used to attach or immobilize the materials together. In some cases, the materials may be attached or immobilized together using suitable fibers or threads. One or more than one type of fiber or thread can be used, depending on the application. For example, in one set of embodiments, one or more fibers are inserted or needled through the materials in order to immobilize the materials together. Examples of suitable fibers include any of those described herein, e.g., cotton or other plant fibers, wood fibers, animal fibers, glass fibers, fiberglass, carbon fibers, mineral fibers, metallic fibers, synthetic or polymeric fibers, etc. In some cases, however, no separate immobilization fibers are added, and needling may be sufficient to attach or immobilized the materials together (and/or to other materials, if present).

If needling techniques such as needlepunching or needlefelting are used, the needles may be inserted at any suitable density to attach or immobilize the materials together. For example, the density of needle insertions may be at least about 1 insertion/in$^2$, at least about 3 insertions/in$^2$, at least about 5 insertions/in$^2$, at least about 10 insertions/in$^2$, at least about 30 insertions/in$^2$, at least about 50 insertions/in$^2$, at least about 100 insertions/in$^2$, at least about 300 insertions/in$^2$, at least about 500 insertions/in$^2$, at least about 1,000 insertions/in$^2$, at least about 3,000 insertions/in$^2$, at least about 5,000 insertions/in$^2$, at least about 10,000 insertions/in$^2$, at least about 30,000 insertions/in$^2$, at least about 50,000 insertions/in$^2$, at least about 100,000 insertions/in$^2$, at least about 300,000 insertions/in$^2$, at least about 500,000 insertions/in$^2$, at least about 1,000,000 insertions/in$^2$, etc. In some cases, there may be no more than about 1,000,000 insertions/in$^2$, no more than about 500,000 insertions/in$^2$, no more than about 300,000 insertions/in$^2$, no more than about 100,000 insertions/in$^2$, no more than about 50,000 insertions/in$^2$, no more than about 30,000 insertions/in$^2$, no more than about 10,000 insertions/in$^2$, no more than about 5,000 insertions/in$^2$, no more than about 3,000 insertions/in$^2$, no more than about 1,000 insertions/in$^2$, no more than about 500 insertions/in$^2$, no more than about 300 insertions/in$^2$, no more than about 100 insertions/in$^2$, no more than about 50 insertions/in$^2$, no more than about 30 insertions/in$^2$, no more than about 10 insertions/in$^2$, etc. Combinations of any of the above insertion values are also possible in some embodiments.

In some cases, other materials or layers may be joined to the nonwoven structure by pressing and/or heating these materials to the nonwoven structure while forming the article. In some cases, for example, some of the first polymer may creep into contact with such materials to attach or immobilize these together. As another example, a resin or a polymer different from the first polymer may be melted to attach or immobilize the nonwoven structure to the other materials within the article.

As mentioned, in one set of embodiments, the composite comprises a foam. The foam may be any suitable foam, and the foam may be open-cell foam or a closed-cell foam, or a combination of these. The foam may also have any average cell size, which can be readily determined using techniques known to those of ordinary skill in the art, e.g., such as microscopic techniques. For example, the foam can have an average cell size of less than about 1 cm, less than about 5 mm, less than about 3 mm, less than about 1 mm, less than about 0.5 mm, less than about 0.3 mm, or less than about 0.2 mm. The average cell size may also be less than about 100 micrometers, less than about 90 micrometers, less than about 80 micrometers, less than about 70 micrometers, less than about 60 micrometers, less than about 50 micrometers, less than about 40 micrometers, less than about 30 micrometers, less than about 20 micrometers, less than about 10 micrometers, etc. The foam may also, in certain instances, have an average cell size of at least about 10 micrometers, at least about 20 micrometers, at least about 30 micrometers, at least about 40 micrometers, at least about 50 micrometers, at least about 60 micrometers, at least about 70 micrometers, at least about 80 micrometers, at least about 90 micrometers, at least about 100 micrometers, at least about 200 micrometers, at least about 300 micrometers, at least about 500 micrometers, at least about 1 mm, at least about 3 mm, at least about 5 mm, at least about 1 cm, etc. The foam can also have an average cell size that falls within any of these values, e.g., the foam may have an average cell size of between about 1 mm and about 5 mm.

Non-limiting examples of foams that can be used include, but are not limited to, polymeric foams such as Styrofoam, polyurethane foams, polyvinylidene fluoride foams, polyimide foams, latex foams, polyetherimide foams, melamine foams, or the like. The foam may comprise only one of these polymers, or in some instances, the foam comprises more than one of these polymers. The foam can also be a syntactic foam in certain cases, and/or the foam may comprise other materials, such as cenospheres, glass microspheres, carbon microspheres, polymeric microspheres, etc. The microspheres, if present, can be solid or hollow.

The foam can have any suitable density. For example, the density of the foam may be at least about 0.001 $g/cm^3$, at least about 0.002 $g/cm^3$, at least about 0.004 $g/cm^3$, at least about 0.006 $g/cm^3$, at least about 0.008 $g/cm^3$, at least about 0.01 $g/cm^3$, at least about 0.02 $g/cm^3$, at least about 0.4 $g/cm^3$, at least about 0.06 $g/cm^3$, at least about 0.08 $g/cm^3$, at least about 0.1 $g/cm^3$, at least about 0.2 $g/cm^3$, at least about 0.3 $g/cm^3$, at least about 0.4 $g/cm^3$, at least about 0.5 $g/cm^3$, at least about 0.6 $g/cm^3$, at least about 0.7 $g/cm^3$, at least about 0.8 $g/cm^3$, at least about 0.9 $g/cm^3$, at least about 1 $g/cm^3$, at least about 2 $g/cm^3$, at least about 3 $g/cm^3$, etc. In some cases, the density of the foam may be no more than about 1 $g/cm^3$, no more than about 0.9 $g/cm^3$, no more than about 0.8 $g/cm^3$, no more than about 0.7 $g/cm^3$, no more than about 0.6 $g/cm^3$, no more than about 0.5 $g/cm^3$, no more than about 0.4 $g/cm^3$, no more than about 0.3 $g/cm^3$, no more than about 0.2 $g/cm^3$, no more than about 0.1 $g/cm^3$, no more than about 0.08 $g/cm^3$, no more than about 0.06 $g/cm^3$, no more than about 0.04 $g/cm^3$, no more than about 0.02 $g/cm^3$, no more than about 0.01 $g/cm^3$, no more than about 0.008 $g/cm^3$, no more than about 0.006 $g/cm^3$, no more than about 0.004 $g/cm^3$, no more than about 0.002 $g/cm^3$, etc. In some cases, the density of the foam may be a combination of any of these, e.g., the density of the foam may be between about 0.002 $g/cm^3$ and about 0.2 $g/cm^3$. Thus, as a non-limiting example, the article may comprise a first polymer and second fibers, where the article has an average void volume of at least about 50% and a density of at least about 0.1 $g/cm^3$.

A U.S. patent application, entitled "Composites Comprising Nonwoven Structures and Foam," filed on Mar. 15, 2013, is incorporated herein by reference in its entirety.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, material, kit, and/or method described herein. In addition, any combination of two or more such features, systems, materials, kits, and/or methods, if such features, systems, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article comprising fibers and polyetherimide disposed on at least some of the fibers, wherein the polyetherimide exhibits crystallinity, without showing microscopic flow around the fibers.

2. The article of claim 1, wherein the fibers comprise poly(paraphenylene terephthalamide).

3. The article of claim 1, wherein the fibers comprise polymeric fibers.

4. The article of claim 1, wherein the fibers comprise glass fibers.

5. The article of claim 1, wherein the fibers comprise fiberglass.

6. The article of claim 1, wherein the fibers comprise carbon fibers.

7. The article of claim 1, wherein the article has an average void volume of at least about 50%.

8. The article of claim 1, wherein the article has a density of at least about 0.1 g/cm$^3$.

9. The article of claim 1, wherein the article has an average pore size of between about 5 micrometers and about 50 micrometers as determined by microscopy.

10. The article of claim 1, wherein the article comprises a nonwoven structure.

11. The article of claim 1, wherein at least some of the polyetherimide is present as fibers comprising the polyetherimide.

12. The article of claim 1, wherein the fibers have an average length of between about 3 inches and about 6 inches.

13. The article of claim 1, wherein the fibers have an average diameter of between about 15 micrometers and about 30 micrometers.

14. The article of claim 1, wherein the article further comprises a flame retardant.

15. The article of claim 1, wherein the article is constructed and arranged to satisfy the flammability test defined in 14 C.F.R. § 25(App. F)(VI) (2012).

16. The article of claim 1, wherein the article is constructed and arranged such that, when substantially the entire outer surface of the article is exposed to a radiant heat flux of 1.7 W/cm$^2$ and an open pilot flame for 30 seconds, the article exhibits no flame propagation beyond 2 inches and no flame time beyond 3 seconds after exposure to the open pilot flame.

17. The article of claim 1, wherein the article is constructed and arranged to satisfy the smoke emission test defined in 14 C.F.R. § 25(App. F)(V) (2012) and ASTM F814-83.

18. The article of claim 1, wherein the article is constructed and arranged such that, when the article is contained with a container and ignited to produce smoke, a beam of light traveling 900 mm through the smoke exhibits a specific optical density of no more than 200 Ds.

19. The article of claim 1, wherein the article is constructed and arranged to satisfy the heat release test defined in 14 C.F.R. § 25(App. F)(IV) (2012).

20. The article of claim 1, wherein the article is constructed and arranged such that, when substantially the entire outer surface of the article is exposed to radiant heat of 3.5 W/cm$^2$ and an open pilot flame for 5 minutes, the article produces no more than 65 kW min/m$^2$ of heat.

21. The article of claim 1, wherein the article is prepared by a process comprising applying heat to the article sufficient to increase crystallization of the polyetherimide by at least about 10%.

22. The article of claim 1, wherein the article is prepared by a process comprising applying heat to the article sufficient to increase crystallization of the polyetherimide by at least about 25%.

23. The article of claim 1, wherein the article is prepared by a process comprising applying heat to the article such that the temperature of the article does not exceed about 600° F.

24. The article of claim 1, wherein the article is prepared by a process comprising applying heat to the article such that the temperature of the article does not exceed about 450° F.

25. The article of claim 1, wherein the article is prepared by a process comprising applying heat to the article without applying pressure to the article.

26. A composite, comprising foam immobilized to a surface of the article of claim 1.

27. The composite of claim 26, wherein the foam comprises melamine, polyurethane, polyvinylidene fluoride, polyimide, and/or polyetherimide.

* * * * *